United States Patent
Davidts et al.

(10) Patent No.: US 10,105,921 B2
(45) Date of Patent: Oct. 23, 2018

(54) CLOSURE FOR A PRODUCT-RETAINING CONTAINER

(71) Applicant: NOMACORC LLC, Zebulon, NC (US)

(72) Inventors: Sandra Davidts, Battice (BE); Olav Marcus Aagaard, Rotterdam (NL); Katherine Campbell Glasgow, Wake Forest, NC (US)

(73) Assignee: VINVENTIONS USA, LLC, Zebulon, NC (US)

( * ) Notice: Subject to any disclaimer, the term of this patent is extended or adjusted under 35 U.S.C. 154(b) by 462 days.

(21) Appl. No.: 14/246,627

(22) Filed: Apr. 7, 2014

(65) Prior Publication Data

US 2014/0299570 A1    Oct. 9, 2014

Related U.S. Application Data

(60) Provisional application No. 61/808,802, filed on Apr. 5, 2013.

(51) Int. Cl.
  *B65D 39/00*    (2006.01)
  *B29D 99/00*    (2010.01)
  (Continued)

(52) U.S. Cl.
  CPC .......... *B29D 99/0096* (2013.01); *B29C 44/22* (2013.01); *B29C 45/0001* (2013.01); *B29C 47/0004* (2013.01); *B29C 47/0016* (2013.01); *B29C 47/025* (2013.01); *B29C 47/065* (2013.01); *B65D 39/0058* (2013.01); *C08J 9/0061* (2013.01); *B29C 47/0066* (2013.01); *B29K 2023/38* (2013.01); *B29L 2031/565* (2013.01); *C08J 2205/046* (2013.01);
  (Continued)

(58) Field of Classification Search
  CPC ............ B65D 39/0011; B65D 39/0017; B65D 39/0023; B65D 39/0029; B65D 39/0041; B65D 39/0058; B65D 39/0064; B65D 39/007; B65D 39/0076; B65D 39/0088; B65D 2251/00; B29D 99/0096
  See application file for complete search history.

(56) References Cited

U.S. PATENT DOCUMENTS

| | | | |
|---|---|---|---|
| 3,135,410 A | 1/1964 | Federighi | |
| 3,651,841 A | 3/1972 | Ohlsson | |

(Continued)

FOREIGN PATENT DOCUMENTS

| | | |
|---|---|---|
| AU | 2012224574 A1 | 5/2013 |
| CL | 1950-2002 | 8/2003 |

(Continued)

OTHER PUBLICATIONS

International Preliminary Report on Patentability for PCT/US2014/033177, dated Oct. 15, 2015, 8 pages.

(Continued)

*Primary Examiner* — Scott R. Walshon
(74) *Attorney, Agent, or Firm* — Withrow & Terranova, P.L.L.C.; Vincent K. Gustafson

(57) ABSTRACT

A synthetic closure for a product-retaining container is constructed for being inserted and securely retained in a portal-forming neck of said container, said closure comprising at least a core member comprising at least one cycloolefin-based copolymer.

31 Claims, 1 Drawing Sheet

US 10,105,921 B2//Page 2

(51) Int. Cl.
    *B29C 47/00*    (2006.01)
    *B29C 45/00*    (2006.01)
    *C08J 9/00*     (2006.01)
    *B29C 44/22*    (2006.01)
    *B29C 47/02*    (2006.01)
    *B29C 47/06*    (2006.01)
    *B29L 31/56*    (2006.01)
    *B29K 23/00*    (2006.01)

(52) U.S. Cl.
    CPC ...... *C08J 2205/052* (2013.01); *C08J 2323/06* (2013.01); *C08J 2445/00* (2013.01)

(56) References Cited

U.S. PATENT DOCUMENTS

| | | | |
|---|---|---|---|
| 4,134,491 A | 1/1979 | Turillon et al. | |
| 4,150,744 A | 4/1979 | Fennimore | |
| 5,024,130 A | 6/1991 | Hays, Jr. | |
| 5,179,171 A * | 1/1993 | Minami | C08F 210/02 525/288 |
| 5,480,915 A | 1/1996 | Burns | |
| 5,501,525 A | 3/1996 | Cox et al. | |
| 5,904,965 A | 5/1999 | Noel et al. | |
| 6,022,816 A | 2/2000 | Dewar | |
| 6,085,923 A | 7/2000 | Yaniger | |
| 6,153,275 A | 11/2000 | Yaniger | |
| 6,221,450 B1 | 4/2001 | Noel et al. | |
| 6,221,451 B1 | 4/2001 | Lauer et al. | |
| 6,355,320 B1 | 3/2002 | Allman et al. | |
| 6,548,598 B2 | 4/2003 | Takeuchi et al. | |
| 6,613,406 B1 | 9/2003 | Yaniger | |
| 6,651,834 B2 | 11/2003 | Wong | |
| 7,285,315 B2 | 10/2007 | Fragola | |
| 7,314,661 B2 | 1/2008 | Hueto | |
| 7,770,747 B2 | 8/2010 | Lauer et al. | |
| 8,063,163 B2 | 11/2011 | Hatke et al. | |
| 8,092,877 B2 * | 1/2012 | Jester | B32B 27/32 428/36.6 |
| 8,283,394 B2 | 10/2012 | Pfaadt | |
| 2002/0103275 A1 | 8/2002 | Nogueria de Sousa | |
| 2002/0180083 A1 | 12/2002 | Yaniger | |
| 2003/0161985 A1 | 8/2003 | Lauer | |
| 2005/0137073 A1 | 6/2005 | Weaver | |
| 2005/0208244 A1 | 9/2005 | Delmas | |
| 2006/0006132 A1 | 1/2006 | Lauer et al. | |
| 2006/0021487 A1 | 2/2006 | Dickover et al. | |
| 2006/0096468 A1 | 5/2006 | Paine | |
| 2007/0071939 A1 | 3/2007 | Hueto | |
| 2007/0128387 A1 | 6/2007 | Unwin et al. | |
| 2007/0163128 A1 | 7/2007 | Tarrerias | |
| 2007/0203266 A1 | 8/2007 | Holmes et al. | |
| 2008/0000337 A1 | 1/2008 | Dickover et al. | |
| 2008/0229569 A1 | 9/2008 | Romao de Sousa | |
| 2008/0300345 A1 | 12/2008 | Pfaadt | |
| 2009/0253818 A1 * | 10/2009 | Kimura | B65D 39/0011 521/140 |
| 2010/0200606 A1 | 8/2010 | Davis et al. | |
| 2011/0184082 A1 | 7/2011 | Wright et al. | |
| 2011/0290757 A1 | 12/2011 | Purdy | |
| 2012/0021151 A1 * | 1/2012 | Tatarka | B32B 1/08 428/35.1 |
| 2013/0118924 A1 | 5/2013 | Vidal et al. | |
| 2013/0327739 A1 | 12/2013 | Davidts et al. | |
| 2013/0328232 A1 | 12/2013 | Bost et al. | |
| 2014/0299570 A1 | 10/2014 | Davidts et al. | |
| 2016/0051946 A1 | 2/2016 | Paetzold | |

FOREIGN PATENT DOCUMENTS

| | | |
|---|---|---|
| CN | 1124968 A | 6/1996 |
| CN | 2380524 Y | 5/2000 |
| CN | 2380584 Y | 5/2000 |
| CN | 1362929 A | 8/2002 |
| CN | 1486266 A | 3/2004 |
| CN | 1900405 A | 1/2007 |
| CN | 101203438 A | 6/2008 |
| CN | 101384666 A | 3/2009 |
| CN | 101558120 A | 10/2009 |
| CN | 101861274 A | 10/2010 |
| CN | 102361801 A | 2/2012 |
| CN | 102388241 A | 3/2012 |
| CN | 102707022 A | 10/2012 |
| DE | 2928499 A1 | 11/1980 |
| DE | 202009012131 U1 | 3/2010 |
| EP | 1908567 A1 | 4/2008 |
| FR | 2441467 A1 | 6/1980 |
| FR | 2703028 A1 | 9/1994 |
| FR | 2799183 A1 | 4/2001 |
| FR | 2850634 A1 | 8/2004 |
| GB | 1499852 | 3/1975 |
| JP | 2003081297 A | 3/2003 |
| JP | 2006275751 A | 10/2006 |
| WO | 9425513 A1 | 11/1994 |
| WO | 9847783 A1 | 10/1998 |
| WO | 0026103 A1 | 5/2000 |
| WO | 03018304 A1 | 3/2003 |
| WO | 03082700 A1 | 10/2003 |
| WO | 2006094529 A1 | 9/2006 |
| WO | 2007040608 A1 | 4/2007 |
| WO | 2008048129 A1 | 4/2008 |
| WO | 2008063458 A2 | 5/2008 |
| WO | 2009063095 A2 | 5/2009 |
| WO | 2010092046 A1 | 8/2010 |
| WO | 2012120101 A1 | 9/2012 |
| WO | 2012120109 A1 | 9/2012 |

OTHER PUBLICATIONS

Non-Final Office Action for U.S. Appl. No. 14/175,266, dated Sep. 16, 2015, 9 pages.

Notification of the First Office Action for Chinese Patent Application No. 201380039735.9, dated Sep. 15, 2015, 25 pages.

ASTM Standard D792, "Standard Test Methods for Density and Specific Gravity (Relative Density) of Plastics by Displacement," ASTM International, 2013, 6 pages.

ASTM Standard D1238, "Standard Test Method for Melt Flow Rates of Thermoplastics by Extrusion Plastometer," ASTM International, 2013, 16 pages.

ASTM Standard D1525, "Standard Test Method for Vicat Softening Temperature of Plastics," ASTM International, 2009, 10 pages.

ASTM Standard D1928, , "Standard Practice for Preparation of Compression-Molded Polyethylene Test Sheets and Test Specimens," ASTM International, 1996, 7 pages.

ISO Standard 306, "Plastics—Thermoplastic materials—Determination of Vicat softening temperature (VST)," International Organization for Standardization, 2013, 24 pages.

ISO Standard 527, "Plastics—Determination of tensile properties—Part 1: General principles," International Organization for Standardization, 2012, 28 pages.

ISO Standard 815, "Rubber, vulcanized or thermoplastic—Determination of compression set—Part 1: At ambient or elevated temperatures," International Organization for Standardization, 2014, 18 pages.

Iso Standard 868, "Plastics and ebonite—Determination of indentation hardness by means of a durometer (Shore hardness)," International Organization for Standardization, 2003, 6 pages.

ISO Standard 1183, "Plastics—Methods for determining the density of non-cellular plastics—Part 1: Immersion method, liquid pyknometer method and titration method," International Organization for Standardization, 2012, 16 pages.

ISO Standard 2030, "Granulated cork—Size analysis by mechanical sieving," International Organization for Standardization, 1990, 4 pages.

Martins, Rui C. et al., "Oxidation Management of White Wines Using Cyclic Voltammetry and Multivariate Process Monitoring," Journal of Agricultural and Food Chemistry, vol. 56, American Chemical Society, Nov. 19, 2008, pp. 12092-12098.

(56) References Cited

OTHER PUBLICATIONS

Prieto-Simón, B. et al., "Electrochemical biosensors as a tool for antioxidant capacity assessment," Sensors and Actuators B: Chemical, vol. 129, Issue 1, Elsevier B.V., Jan. 29, 2008, pp. 459-466.
International Preliminary Report on Patentability for International Patent Application No. PCT/EP2013/061433, dated Oct. 21, 2014, 17 pages.
Australian Patent Examination Report for Australian Patent Application No. 2013204654, dated Jan. 21, 2015, 3 pages.
International Preliminary Report on Patentability for International Patent Application No. PCT/US2013/044475, dated Dec. 18, 2014, 9 pages.
Final Office Action for U.S. Appl. No. 13/674,164, dated Mar. 27, 2015, 12 pages.
Canadian Examination Search Report for Canadian Patent Application No. 2,855,255, dated Jan. 27, 2015, 4 pages.
Australian Patent Examination Report for Australian Patent Application No. 2013204648, dated Jan. 22, 2015, 4 pages.
Non-final Office Action for U.S. Appl. No. 13/911,434, dated Jan. 29, 2015, 19 pages.
International Preliminary Report on Patentability for PCT/US2013/071242, dated Jun. 4, 2015, 7 pages.
Non-Final Office Action for U.S. Appl. No. 13/911,477, dated May 12, 2015, 13 pages.
Notification of the First Office Action for Chinese Patent Application No. 2012800668445, dated Jul. 27, 2015, 35 pages.
Non-Final Office Action for U.S. Appl. No. 13/674,164, dated Jan. 8, 2016, 14 pages.
Non-Final Office Action for U.S. Appl. No. 13/911,477, dated Feb. 26, 2016, 9 pages.
Maren, "Wine Cork Wreath—Part 1," a constant project, Nov. 2, 2010, 3 pages, http://aconstantproject.blogspot.de/2010/11/wine-cork-wreath-part-1.html.
Extended European Search Report for European Patent Application No. 13800082.3, dated Feb. 26, 2016, 6 pages.
International Preliminary Report on Patentability for PCT/US2014/015313, completed Jul. 7, 2015, 18 pages.
English Translation of Notification of the First Office Action for Chinese Patent Application No. 201380060842.X, dated Mar. 2, 2016, 14 pages.
Final Office Action for U.S. Appl. No. 13/911,434, dated May 5, 2016, 15 pages.
Final Office Action for U.S. Appl. No. 14/175,266, dated Apr. 19, 2016, 9 pages.
European Patent Examination Report for European Patent Application No. 12787419.6, dated May 27, 2015, 4 pages.
Non-Final Office Action for U.S. Appl. No. 13/911,434, dated Jul. 14, 2015, 14 pages.
Author Unknown, "Standard Test Method for Oxygen Transmission Rate Through Dry Packages Using a Coulometric Sensor," ASTM Standard F1307-02, ASTM International, 2007, 7 pages.
Avramescu, Alina et al., "Screen-printed biosensors for the control of wine quality based on lactate and acetaldehyde determination," Analytica Chimica Acta, vol. 458, Elsevier Science B.V., Apr. 29, 2002, pp. 203-213.
Caille, Soline et al., "Sensory characteristics changes of red Grenache wines submitted to different oxygen exposures pre and post bottling," Analytica Chimica Acta, vol. 660, Elsevier B.V., Available online Dec. 3, 2009, pp. 35-42.
Crank, John, "The Mathematics of Diffusion (Second Edition)," Clarendon Press, Oxford, 1975, pp. 45-53.
Crochiere, George K., "Measuring oxygen ingress during bottling/storage," Practical Winery and Vineyard Journal, Wine Communications Group, Jan./Feb. 2007, pp. 74-84.
Du Toit, W.J. et al., "Oxygen in Must and Wine: A review," South African Journal of Enology and Viticulture, vol. 27, No. 1, 2006, pp. 76-94.
Barroso, M.F. et al., "Towards a reliable technology for antioxidant capacity and oxidative damage evaluation: Electrochemical (bio)sensors," Biosensors and Bioelectronics, vol. 30, Issue 1, Elsevier B.V., Available online Sep. 3, 2011, pp. 1-12.
Godden, Peter et al., "Wine bottle closures: physical characteristics and effect on composition and sensory properties of a Semillon wine, 1. Performance up to 20 months post-bottling," Australian Journal of Grape and Wine Research, vol. 7, Issue 2, Jul. 2001, pp. 64-1055.
Guan, Wen-Jun et al., "Glucose biosensor based on multi-wall carbon nanotubes and screen printed carbon electrodes," Biosensors and Bioelectronics, vol. 21, Issue 3, Elsevier B.V., Sep. 15, 2005, pp. 508-512.
Liu, Jifeng et al., "Antioxidant Redox Sensors Based on DNA Modified Carbon Screen-Printed Electrodes," Analytical Chemistry, vol. 78, No. 19, American Chemical Society, Oct. 1, 2006, pp. 6879-6884.
Liu, Jifeng et al., "Antioxidant Sensors Based on DNA Modified Electrodes," Analytical Chemistry, vol. 77, No. 23, American Chemical Society, Dec. 1, 2005, pp. 7687-7694.
Lopes, Paulo et al., "Impact of Oxygen Dissolved at Bottling and Transmitted through Closures on the Composition and Sensory Properties of a Sauvignon Blanc Wine during Bottle Storage," Journal of Agricultural and Food Chemistry, vol. 57, No. 21, American Chemical Society, Nov. 11, 2009, pp. 10261-10270.
Lopes, Paulo et al., "Main Routes of Oxygen Ingress through Different Closures into Wine Bottles," Journal of Agricultural and Food Chemistry, vol. 55, No. 13, American Chemical Society, Jun. 27, 2007, pp. 5167-5170.
Lopes, Paulo et al., "Nondestructive Colorimetric Method to Determine the Oxygen Diffusion Rate through Closures Used in Winemaking," Journal of Agricultural and Food Chemistry, vol. 53, No. 18, American Chemical Society, Sep. 7, 2005, pp. 6967-6973.
Lundquist, L. et al., "Oxygen Transmission Rate Measurement Using Oxygen Sensitive Fluorescent Tracers," Presented at the Technical Association of the Pulp and Paper Industry PLACE Division Conference, Aug. 29-Sep. 2, 2004, Indianapolis, Indiana, 13 pages.
Mello, L.D., "Biosensors as a tool for the antioxidant status evaluation," Talanta, vol. 72, Elsevier B.V., Available online Jan. 4, 2007, pp. 335-348.
Pocas, Maria F. et al., "Measurement of Oxygen Transmission Rate through Foamed Materials for Bottle Closures," Packaging Technology and Science, vol. 23, Issue 1, John Wiley & Sons, Ltd., Jan./Feb. 2010, pp. 27-33.
Rabiot, Dominique et al., "Study of the Oxygen Transfer Through Synthetic Corks for Wine Conservation," American Institute of Chemical Engineers, Jan. 1, 1999, 15 pages.
Skouroumounis, George et al., "Oxygen ingress into bottled wine," Practical Winery and Vineyard Journal, Wine Communications Group, Jul./Aug. 2008, pp. 6-14.
Silva Ferreira, Antonio Cesar et al., "Identification of Key Odorants Related to the Typical Aroma of Oxidation-Spoiled White Wines," Journal of Agricultural and Food Chemistry, vol. 51, No. 5, American Chemical Society, Feb. 26, 2003, pp. 1377-1381.
Squarzoni, Margherita et al., "Innovative method for the evaluation of oxygen barrier properties of some different kinds of wine stoppers," Industrie delle Bevande, vol. 33, Apr. 2004, pp. 113-116.
Wirth, J. et al., "The impact of oxygen exposure before and after bottling on the polyphenolic composition of red wines," Food Chemistry, vol. 123, Elsevier Ltd., Nov. 1, 2010, pp. 107-116.
International Search Report and Written Opinion for PCT/US2014/015313 dated May 23, 2014, 10 pages.
International Search Report and Written Opinion for PCT/US2014/033177 dated Jun. 6, 2014, 10 pageS.
Non-final Office Action for U.S. Appl. No. 13/674,164 dated Jul. 7, 2014, 11 pages.
Alonso, Angeles et al., "Determination of Antioxidant Power of Red and White Wines by a New Electrochemical Method and Its Correlation with Polyphenolic Content," Journal of Agricultural and Food Chemistry, vol. 50, American Chemical Society, Apr. 30, 2002, pp. 3112-3115.
Celotti, Emilio et al., "The analytical evaluation of wine oxidability," The Australian & New Zealand Grapegrower & Winemaker, Ryan Publications Pty. Ltd., Feb. 2006, pp. 47-52.

(56) References Cited

OTHER PUBLICATIONS

Diéval et al., "Measurement of the Oxygen Transmission Rate of Co-extruded Wine Bottle Closures Using a Luminescence-Based Technique", Packaging Technology and Science, vol. 24, Issue 7, John Wiley & Sons, Ltd., Nov. 2011, pp. 375-385.
Kilmartin, Paul et al., "A Cyclic Voltammetry Method Suitable for Characterizing Antioxidant Properties of Wine and Wine Phenolics," Journal of Agricultural and Food Chemistry, vol. 49, American Chemical Society, Mar. 10, 2001, pp. 1957-1965.
International Search Report for PCT/EP2012/072155, dated Feb. 15, 2013, 11 pages.
International Search Report and Written Opinion for PCT/US13/44475 dated Oct. 10, 2013, 10 pages.
International Search Report and Written Opinion for PCT/US2013/071242 dated Jan. 16, 2014, 11 pages.
Makhotkina, Olga, "Uncovering the influence of antioxidants on polyphenol oxidation in wines using an electrochemical method: Cyclic voltammetry," Journal of Electroanalytical Chemistry, vol. 633, Elsevier B.V., Available online May 27, 2009, pp. 165-174, 2009.
Rodrigues, Astride et al., "Resistance to Oxidation of White Wines Assessed by Voltammetric Means," Journal of Agricultural and Food Chemistry, vol. 55, American Chemical Society, Nov. 23, 2007, pp. 10557-10562.
Australian Patent Examination Report for Patent Application No. 2013204683 dated Mar. 21, 2014, 4 pages.
Notification of the First Office Action for Chinese Patent Application No. 201480001531.0, dated Oct. 8, 2015, 23 pages.
Notification of the Second Office Action for Chinese Patent Application No. 201480001531.0, dated Jul. 18, 2016, 22 pages.
Non-Final Office Action for U.S. Appl. No. 14/086,367, dated Aug. 26, 2016, 7 pages.
Final Office Action for U.S. Appl. No. 13/674,164, dated Sep. 23, 2016, 13 pages.
Advisory Action and Examiner-Initiated Interview Summary for U.S. Appl. No. 13/911,434, dated Aug. 26, 2016, 6 pages.
Final Office Action for U.S. Appl. No. 13/911,477, dated Aug. 26, 2016, 12 pages.
Advisory Action for U.S. Appl. No. 14/175,266, dated Aug. 9, 2016, 3 pages.
Non-Final Office Action for U.S. Appl. No. 13/911,434, dated Mar. 9, 2017, 14 pages.
Notice of Allowance for U.S. Appl. No. 13/911,477, dated Feb. 27, 2017, 7 pages.
Examination Report for European Patent Application No. 14706738.3, dated Nov. 10, 2017, 7 pages.
Final Office Action for U.S. Appl. No. 13/911,434, dated Dec. 21, 2017, 17 pages.
Translated Summary of the First Examination Report for Chilean Patent Application No. 01232-2014, dated Jun. 21, 2017, 2 pages.
Non-Final Office Action for U.S. Appl. No. 14/086,367, dated Jun. 30, 2017, 7 pages.
Non-Final Office Action for U.S. Appl. No. 13/674,164, dated Jun. 20, 2017, 13 pages.
Examiner's Answer for U.S. Appl. No. 14/175,266, dated Aug. 31, 2017, 8 pages.
First Examination Report for Chilean Patent Application No. 2014-003320, dated Jan. 3, 2018 (10 pages including English translation).
First Examination Report for Chilean Patent Application No. 2014-003323, dated Jan. 5, 2018 (10 pages including English translation).
Australian Patent Examination Report for Australian Patent Application No. 2013204654, dated Jan. 20, 2016, 3 pages.
Examination Search Report for Canadian Patent Application No. 2,875,439, dated Mar. 10, 2015, 4 pages.
Examination Search Report for Canadian Patent Application No. 2,875,439, dated Nov. 16, 2015, 7 pages.
Australian Patent Examination Report for Australian Patent Application No. 2013204663, dated Dec. 9, 2014, 4 pages.
Examination Search Report for Canadian Patent Application No. 2,875,608, dated Feb. 24, 2015, 3 pages.
Examination Search Report for Canadian Patent Application No. 2,875,608, dated Nov. 20, 2015, 3 pages.
Examination Report for European Patent Application No. 138000823, dated Sep. 21, 2017, 5 pages.
Non-Final Office Action for U.S. Appl. No. 14/086,367, dated May 4, 2018, 7 pages.
First Examination Report for Chilean Patent Application No. 2015-001303, dated Apr. 26, 2017, 16 pages.
Notification of the Second Office Action Office Action for Chinese Patent Application No. 201380060842.X, dated Nov. 9, 2016, 24 pages.
Notification of the Third Office Action Office Action for Chinese Patent Application No. 201380060842.X, dated Jul. 28, 2017, 25 pages.
Examination Report for European Patent Application No. 13799174.1, dated Dec. 22, 2016, 6 pages.
Examination Report for European Patent Application No. 13799174.1, dated Jan. 10, 2018, 8 pages.
Australian Patent Examination Report for Australian Patent Application No. 2013205007, dated Apr. 16, 2015, 6 pages.
Examination Search Report for Canadian Patent Application No. 2,875,675, dated Mar. 5, 2015, 5 pages.
Examination Search Report for Canadian Patent Application No. 2,875,675, dated Nov. 27, 2015, 6 pages.
Notification of the Third Office Action for Chinese Patent Application No. 201480001531.0, dated Jan. 26, 2017, 29 pages.
Notification of the Fourth Office Action for Chinese Patent Application No. 201480001531.0, dated Oct. 25, 2017, 27 pages.
Australian Patent Examination Report for Australian Patent Application No. 2013204542, dated Apr. 16, 2015, 5 pages.
Examination Report for European Patent Application No. 14721710.3, dated Oct. 13, 2016, 7 pages.
Examination Report for European Patent Application No. 14721710.3, dated Apr. 12, 2017, 6 pages.
Examination Report for European Patent Application No. 14721710.3, dated Nov. 8, 2017, 4 pages.
Examination Report for European Patent Application No. 14721710.3, dated Feb. 20, 2018, 4 pages.
Examination Report for European Patent Application No. 12787419.6, dated Mar. 24, 2016, 6 pages.
Examination Report for European Patent Application No. 12787419.6, dated Oct. 28, 2016, 4 pages.
Examination Report for European Patent Application No. 12787419.6, dated Sep. 6, 2017, 4 pages.
Notification of the Second Office Action for Chinese Patent Application No. 2012800668445, dated Apr. 1, 2016, 9 pages.
Notification of the Third Office Action for Chinese Patent Application No. 2012800668445, dated Oct. 8, 2016, 8 pages.
Notification of the Fourth Office Action for Chinese Patent Application No. 2012800668445, dated Jun. 2, 2017, 8 pages.
Notification of the First Office Action for Chinese Patent Application No. 201380039744.8, dated Sep. 2, 2015, 31 pages.
Notification of the Second Office Action for Chinese Patent Application No. 201380039744.8, dated Jul. 18, 2016, 27 pages.
Notification of the Third Office Action for Chinese Patent Application No. 201380039744.8, dated Feb. 4, 2017, 10 pages.
Notification of the Fourth Office Action for Chinese Patent Application No. 201380039744.8, dated Oct. 20, 2017, 3 pages.
Examination Report for European Patent Application No. 13728148.1, dated Dec. 11, 2015, 4 pages.
Notice of Allowance for U.S. Appl. No. 13/674,164, dated May 18, 2018, 8 pages.
Author Unknown, "Kraton G SEBS/SEPS," Product Specification, kraton.com:80/Products/Kraton_G_SEBS_SEPS, May 22, 2011, Kraton Performance Polymers Inc., 2 pages.
Non-final Office Action for U.S. Appl. No. 13/911,434, dated Jul. 26, 2018, 13 pages.

\* cited by examiner

CLOSURE FOR A PRODUCT-RETAINING CONTAINER

PRIORITY APPLICATION

The present application claims priority to U.S. Provisional Patent Application Ser. No. 61/808,802 filed on Apr. 5, 2013 entitled "CLOSURE FOR A PRODUCT-RETAINING CONTAINER," which is incorporated herein by reference in its entirety.

FIELD OF THE DISCLOSURE

The present disclosure relates to a closure for a product retaining container, to a method of preparing a closure for a product retaining container, to a closure that is obtainable by a method of the present disclosure, to a use of the disclosed closure for sealingly closing a product-retaining container, and to a use of a cycloolefin-based copolymer in a closure for a product-retaining container.

BACKGROUND

In view of the wide variety of products that are sold for being dispensed from containers, particularly containers with round necks which define the dispensing portal, numerous constructions have evolved for container stoppers or closure means for the portals, including for example screw caps, stoppers, corks and crown caps, to name a few. Generally, products such as vinegar, vegetable oils, laboratory liquids, detergents, honey, condiments, spices, alcoholic beverages, and the like, have similar needs regarding the type and construction of the closure means used for containers for these products. However, wine sold in bottles represents the most demanding product in terms of bottle closure technology. In an attempt to best meet these demands, most wine bottle closures or stoppers have been produced from a natural material known as "cork".

While natural cork still remains a dominant material for wine closures, synthetic wine closures have become increasingly popular over the last years, largely due to the shortage in high quality natural cork material and the awareness of wine spoilage as a result of "cork taint", a phenomenon that is associated with natural cork materials. In addition, synthetic closures have the advantage that by means of closure technology, their material content and physical characteristics can be designed, controlled and fine-tuned to satisfy the varying demands that the wide range of different wine types produced throughout the world impose on closures.

One of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In addition, in view of the fact that the jaw members are generally independent of each other and separately movable in order to enable the closure member to be compressed to the substantially reduced diameter, each jaw member comprises a sharp edge which is brought into direct engagement with the closure member when the closure member is fully compressed. Score lines are thus frequently formed on the outer surface of the closure member, which prevents a complete, leak-free seal from being created when the closure member expands into engagement with the bottle neck. This can occur, for example, if the jaw members of the bottling equipment are imperfectly adjusted or worn. Leakage of the product, particularly of liquid product, from the container can thus occur.

Thus, it is generally desirable that any synthetic bottle closure be able to withstand this conventional bottling and sealing method. Furthermore, many cork sealing members also incur damage during the bottling process, resulting in leakage or tainted wine.

Another issue in the wine industry is the capability of the wine stopper to withstand a pressure build up that can occur during the storage of the wine product after it has been bottled and sealed. Due to natural expansion of the wine during hotter months, pressure builds up, which can result in the bottle stopper being displaced from the bottle. As a result, it is generally desirable that the bottle stopper employed for wine products be capable of secure, intimate, frictional engagement with the bottle neck in order to resist any such pressure build up.

A further issue in the wine industry is the general desirability that secure, sealed engagement of the stopper with the neck of the bottle be achieved quickly, if not virtually immediately after the stopper is inserted into the neck of the bottle. During normal wine processing, the stopper is compressed, as detailed above, and inserted into the neck of the bottle to enable the stopper to expand in place and seal the bottle. However, such expansion desirably occurs immediately upon insertion into the bottle since many processors tip the bottle onto its side or neck down after the stopper is inserted into the bottle neck, allowing the bottle to remain stored in this position for extended periods of time. If the stopper is unable to rapidly expand into secure, intimate, frictional contact and engagement with the walls of the neck of the bottle, wine leakage can occur. The expansion of the closure, also referred to as "recovery", should thus be sufficiently rapid to ensure adequate sealing of the bottle in a sufficiently short time span, without, however being so rapid that the closure does not enter the bottle neck, or only partially enters the bottle neck.

It is further desirable that the closure be removable from the bottle using a reasonable extraction force. Although actual extraction forces extend over a wide range, the generally accepted, conventional extraction force is typically below 100 pounds (445 Newtons).

In achieving a commercially viable stopper or closure, a careful balance must be made between secure sealing and providing a reasonable extraction force for removal of the closure from the bottle. Since these two characteristics are believed to be in direct opposition to each other, a careful balance must be achieved so that the stopper or closure is capable of securely sealing the product, in particular the wine in the bottle, preventing or at least reducing both leakage and gas transmission, while also being removable from the bottle without requiring an excessive extraction force.

Furthermore, it is generally desirable that the closure has a low oxygen permeability. Too much oxygen can cause the premature spoilage of wine. In fact, oxidation may occur over a period of time to render the beverage undrinkable. Thus, it is desirable to effectively prevent or reduce oxygen from entering the bottle in order to extend and preserve the freshness and shelf life of the product. Any commercially viable wine stopper or closure should therefore generally have a low oxygen transfer rate (OTR).

A particular challenge is to achieve a secure, sealed engagement of a closure with the neck of a bottle in a desired time span, without impairing the oxygen permeability properties of the closure. These properties generally make conflicting demands on the materials from which the closure is made. The engagement of a closure with the neck of a bottle in a desired time span can in principle be achieved in a number of ways. One possibility is to increase the diameter of the closure. However, this increases the amount of material required and thus the weight and cost of the closure. Another possibility is to use materials with higher elasticity for the closure, or to reduce the density of the closure. However, these generally result in increased oxygen permeability. Oxygen permeability can be improved, on the other hand, in contrast, by using stiffer materials for the closure, by increasing the density of the closure, or by incorporating particular additives. However, these all result in a harder, stiffer closure, and thus in worsened engagement of the closure with the neck of a bottle in a desired time span. For example, cycloolefin-based copolymers, also referred to as cycloolefin copolymers or COCs, which comprise repeating units based on cyclic olefins having an ethylenically unsaturated bond within the cycle, and repeating units based on non-cyclic olefins, have been used in multilayer films owing to their good oxygen barrier properties. However, the known cycloolefin copolymer grades used for multilayer films have too high a viscosity to be usable in processes such as for preparing closures as described herein. Additionally, known cycloolefin copolymers of this type are brittle and, if incorporated into closures for bottles, result in worsened, i.e. slower engagement of the closure with the neck of a bottle in a desired time span.

In addition to the above, it is often desirable for synthetic closures to resemble natural cork closures as closely as possible in appearance. Both the longitudinal surface and the flat ends of cylindrical cork closures generally have an irregular appearance, for example showing naturally occurring irregularities in color, structure and profile. Methods have been developed for providing synthetic closures with a physical appearance similar to natural cork, for example by blending colors to produce a streaking effect in the outer portion of the closure, along the cylindrical axis, or to provide the flat terminating ends of a synthetic closure with a physical appearance similar to natural cork.

It is, furthermore, often desirable to provide decorative indicia such as letters and ornaments on the surface of wine stoppers (e.g. the crest or emblem of a winery). Natural corks are generally marked by a method commonly referred to as "fire branding", i.e. by the application of a hot branding tool. Alternatively, natural corks may also be branded by application of colors or dyes. Due to food safety concerns, marking of natural corks with colors or dyes is generally only effected on the curved cylindrical surface of the cork that is not in direct contact with the wine. On the other hand, marking on the flat terminating surfaces of natural corks is generally effected by means of fire branding only since this method does not impose any food safety concerns.

It is also known to brand synthetic closures. Synthetic closures are commonly branded by means of inkjet or offset printing using special dyes or colors approved for indirect food contact. Since such colors and dyes are normally not approved for direct food contact, marking of synthetic closures with colors or dyes is generally only effected on the curved cylindrical surface of the cork that is not in direct contact with the wine. Such marking can be on the outermost surface, or on an inner surface which is subsequently covered with an outer, optionally substantially transparent, layer. Marking on the flat terminating surfaces of synthetic closures is generally only known for injection molded closures, where marking is effected during the molding process of the closure by providing raised portions on the flat terminating surfaces.

Methods are available for marking the flat terminating surface of synthetic closures that have been manufactured by means of extrusion, in particular by co-extrusion. Laser marking may, in theory, be a feasible method since it allows the avoidance of direct food contact. This method is, however, inherently slow and expensive since it requires the use of special laser dye additives. Also, there have been concerns that laser marking of the flat terminating surfaces of synthetic closures may adversely change the foam structure of the core element, which may, in consequence, adversely affect the sensitive gas permeation properties of such closures.

A further method involves the application of a decorative layer, in particular of a decorative plastic layer, by means of heat and/or pressure transfer. This method allows for permanent branding of synthetic closures without giving rise to concerns relating to food safety and without negatively impacting the gas permeation and/or mechanical properties of synthetic closures, in particular of co-extruded synthetic closures.

Therefore, there exists a need for a synthetic closure or stopper which particularly comprises at least one of the characteristic features described above, said synthetic closure or stopper having a physical appearance and/or tactile characteristics similar in at least one aspect to a natural cork closure, particularly with only minimal impairment, particularly with no impairment or even with improvement of the other properties of the closure such as, inter alia, OTR, leakage, ease of insertion and removal, compressibility and compression recovery, compatibility with food products. It has now been found that closures comprising a cycloolefin-based copolymer having particular properties fulfill at least one of the needs underlying the present disclosure.

Other and more specific needs will in part be apparent and will in part appear hereinafter.

SUMMARY OF THE DETAILED DESCRIPTION

As will become evident from the following detailed disclosure, the synthetic closure of the present disclosure may be employed as a bottle closure or stopper for any desired product. However, for the reasons detailed above, wine products impose the most burdensome standards on a bottle closure. Consequently, in order to clearly demonstrate the universal applicability of the synthetic closure of the present disclosure, the following disclosure focuses on the applicability and usability of the synthetic closure of the present disclosure as a closure or stopper for wine containing bottles. However, this discussion is for exemplary purposes only and is not intended as a limitation of the present disclosure.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry also impart substantial restrictions on the bottle closure, requiring a bottle closure which is highly compressible, has high immediate compression recovery capabilities and can resist any deleterious effects caused by the clamping jaws of the bottle closure equipment.

Although prior art synthetic products have been produced in an attempt to satisfy the need for alternate bottle closures employable in the wine industry, such prior art systems have often been found lacking in one or more of the generally desirable aspects of a bottle closure for wine products. However, by employing the present disclosure, many of the prior art disadvantages have been reduced or even obviated and an effective, easily employed, mass-produced synthetic closure has been realized.

In the present disclosure, many of the prior art disadvantages can be reduced or even overcome by achieving a synthetic closure for a product retaining container constructed for being inserted and securely retained in a portal forming neck of said container and a method for producing such a synthetic closure.

In one aspect the present disclosure provides for a synthetic closure for a product-retaining container constructed for being inserted and securely retained in a portal-forming neck of said container, said closure comprising at least
a) a core member comprising at least one cycloolefin-based copolymer.

The present disclosure further relates to an exemplary method for producing a synthetic closure according to the present disclosure, said method comprising:
a1. providing a core member composition comprising at least one cycloolefin-based copolymer;
b1. providing at least one blowing agent to the core member composition to obtain a composition comprising at least one cycloolefin-based copolymer and at least one blowing agent;
c1. at least one of before, during and after method step b1, heating the core member composition provided in method step a to obtain a heated composition;
d1. extruding a continuous, elongated, substantially cylindrically shaped length of the heated composition obtained in method step c1 to obtain, as core member, a continuous elongated length comprising at least one cycloolefin-based copolymer and having a cylindrical surface; and
e1. cutting the continuous elongated length comprising at least one cycloolefin-based copolymer obtained in method step d1 or the multi-component elongated structure obtained in method step f1 in a plane substantially perpendicular to the central axis of the continuous elongated length or the multi-component elongated structure to obtain a closure.

The present disclosure further relates to a method for producing a synthetic closure according to the present disclosure, said method comprising:
a2. providing a core member composition comprising at least one cycloolefin-based copolymer;
b2. providing at least one blowing agent to the core member composition to obtain a composition comprising at least one cycloolefin-based copolymer and at least one blowing agent;
c2. at least one of before, during and after method step b2, heating the core member composition provided in method step a. to obtain a heated composition;
d2. injecting the heated composition obtained in method step c2 into an injection mold;
e2. maintaining the composition in the injection mold until the composition effectively hardens to form a molded closure;
f2. removing the closure from the injection mold.

The present disclosure accordingly comprises an article of manufacture, and related methods, components, and assemblies, possessing the features, properties, and relation of elements, which will be exemplified in the embodiments herein described, and the scope of the present disclosure will be indicated in the claims.

BRIEF DESCRIPTION OF THE FIGURES

For a fuller understanding of the nature and objects of the present disclosure herein described, reference should be had to the following detailed description taken in connection with the accompanying drawings, in which.

By referring to the FIGURES, along with the following detailed disclosure, the construction and production method for the synthetic closures of the present disclosure can best be understood. In these Figures, as well as in the detailed disclosure herein, the synthetic closure of the present disclosure, and its method of production, is depicted and discussed as a bottle closure for wine products. However, as detailed herein, the present disclosure is applicable as a synthetic closure for use in sealing and retaining any desired product in any desired closure system. However, due to the stringent and difficult demands placed upon closures for wine products, the detailed disclosure herein focuses upon the applicability of the synthetic bottle closures of the present disclosure as a closure for wine bottles. However, it is to be understood that this detailed discussion is provided merely for exemplary purposes and is not intended to limit the present disclosure to this particular application and embodiment.

DETAILED DESCRIPTION

Figure 1:
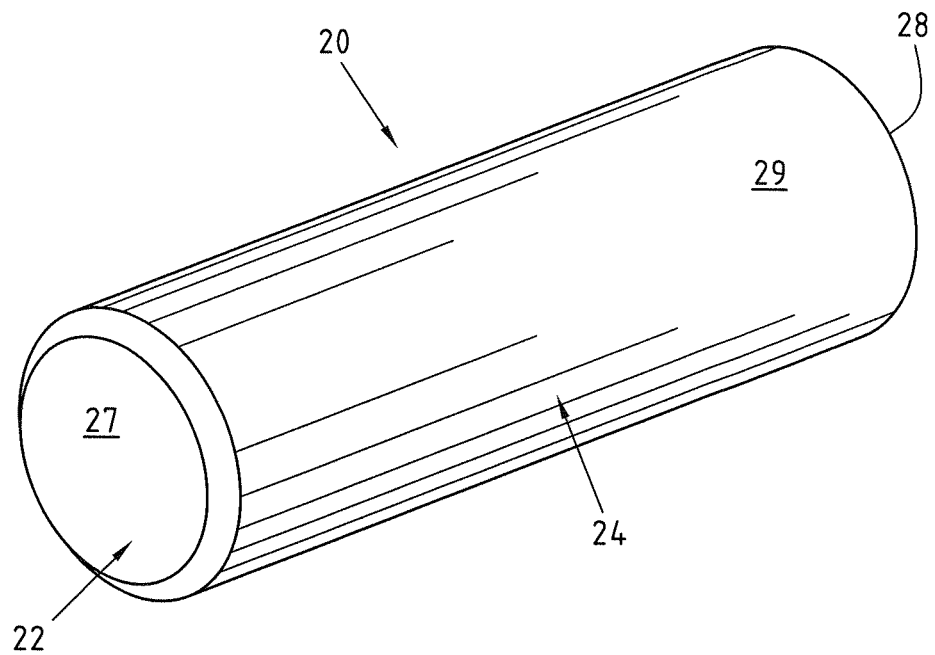
FIG. 1 is a perspective view of a synthetic closure according to an aspect of the present disclosure.
Figure 2:
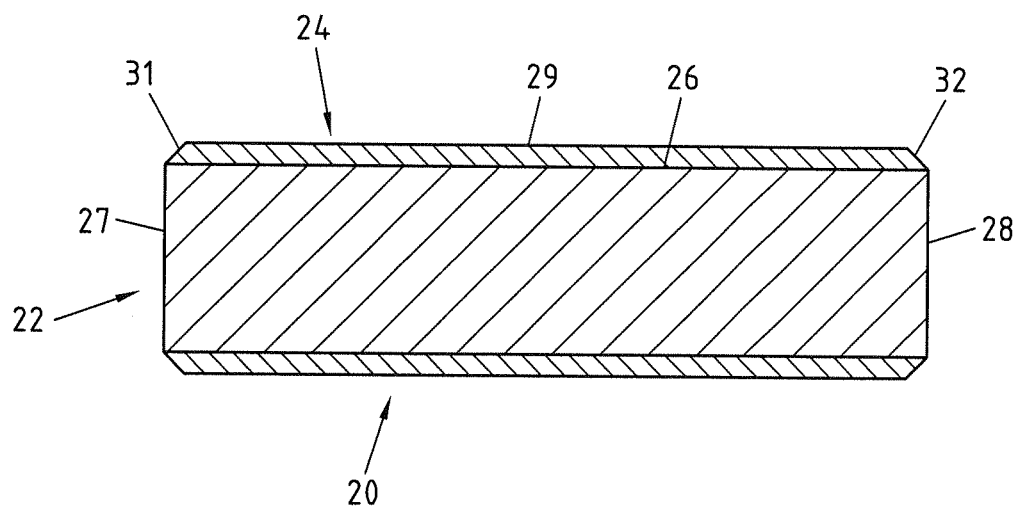
FIG. 2 is a cross sectional-side elevation of a synthetic closure according to an aspect of the present disclosure.

In FIGS. 1 and 2, the exemplary construction of a synthetic closure 20 is depicted comprising a generally cylindrical shape formed by core member 22 and peripheral layer 24 which peripherally surrounds and is intimately bonded to core member 22. In the exemplary aspect, core member 22 comprises a substantially cylindrically shaped surface 26, terminating with substantially flat end surfaces 27 and 28. Whenever applicable, the following detailed description of a synthetic closure having a layered structure, i.e. a core member and a peripheral layer, shall also apply to multilayer closures having more than one peripheral layer.

In an exemplary aspect, peripheral layer 24 is intimately bonded directly to core member 22, peripherally surrounding and enveloping surface 26 of core member 22. Peripheral layer 24 incorporates exposed surface 29, which comprises a substantially cylindrical shape and forms the outer surface of synthetic bottle closure 20 of the present disclosure, along with surfaces 27 and 28 of the substantially flat terminating ends.

In order to assist in assuring entry of synthetic bottle closure 20 into the portal of the bottle into which closure 20 is inserted, terminating edge 31 of peripheral layer 24 may be bevelled or chamfered. Similarly, terminating edge 32 of peripheral layer 24 also may comprise a similar bevel or chamfer. Although any desired bevel or chamfered configuration can be employed, such as a radius, curve, or flat surface, it has been found that by merely cutting ends 31 and 32 with an angle of about 45° or about 60° the desired reduced diameter area is provided for achieving the desired effect. The chamfer angle and the chamfer length, i.e. the length of the chamfered surface as measured between surface 26, or surface 29 if a peripheral layer is comprised, are exemplarily within the ranges described herein for still wine closures or champagne closures.

By incorporating chamfered or bevelled ends 31 and 32 on synthetic bottle closure 20, automatic self-centering is attained. As a result, when synthetic bottle closure 20 is compressed and ejected from the compression jaws into the open bottle for forming the closure thereof, synthetic bottle closure 20 is automatically guided into the bottle opening, even if the clamping jaws are slightly misaligned with the portal of the bottle. By employing this configuration, unwanted difficulties in inserting bottle closure 20 into any desired bottle are obviated. However, in applications which employ alternate stopper insertion techniques, chamfering of ends 31 and 32 may not be needed. Further, in order to facilitate the insertion of the closure into the bottle neck, the outer surface can fully or partly be coated with suitable lubricants, in particular with silicones. Coating with lubricants such as silicones can be carried out by a variety of techniques known in the art, including tumbling and/or extrusion coating. For closures for champagne or sparkling wine, a crosslinkable silicone is advantageously used since silicone can act as an antifoaming agent.

In order to produce the attributes suitable for use in the wine industry, core 22 is formed from foam plastic material as described herein using a continuous extrusion process or an injection molding process.

In order to demonstrate the efficacy of the present disclosure, samples of synthetic bottle closures 20, manufactured in accordance with the present disclosure by extrusion methods and having a foamed core member and a solid peripheral layer, were produced and tested. However, the present disclosure also encompasses closures having a foamed core member with no peripheral layer, as well as corresponding closures manufactured by molding methods, in particular injection molding. Suitable molding methods are known to the skilled person, for example from WO 94/25513 A1.

Test Methods

The tests for extraction force and compression recovery were carried out on a random sample selection according to the methods described in WO 03/018304 A1 (compression test, p. 45, 1. 9-p. 48, 1. 12; extraction test, p. 48, 1. 13-p. 49, 1. 10), which are herewith incorporated and form part of the present disclosure.

Extraction Force

Six clean "Bordeaux" style wine bottles were filled with wine to the 20° C. fill mark using a 63 mm fill gauge. The inside of the bottlenecks was dried with a paper towel to remove wine splashes. The closures were inserted into the bottles using a semi-automatic corking machine (Model 4040 from GAI S.p.A., Italy). Insertion was carried out under a vacuum of less than −20 mm Hg, as read on the corking machine's vacuum gauge. There was approximately 17 mm ullage after insertion of the closures. The bottles were stored for 1 hour or 14 days. The closures were then extracted at ambient temperature using a Dillon AFG-1000N force gauge (from Dillon/Quality Plus, Inc., USA) to measure the force required for extraction, respectively termed the 1 hour extraction force or the 14 day extraction force.

Instantaneous Diameter and Compression Recovery

The instantaneous diameter is determined using an optical micrometer (Keyence 7650 and DATAQ 158-U Analog to Digital converter) positioned at the outlet of the corking machine, which measures the diameter of the closure immediately after the closure has exited the corking machine into the bottle and again two minutes after the closure has exited the corking machine into the bottle. The percent recovery (compression recovery) can be calculated based on the original, uncompressed diameter of the closure and the diameter measured as for instantaneous diameter, immediately after the closure has been compressed and exited the corking machine into the bottle, and at two minutes after the closure has been compressed and exited the corking machine into the bottle, according to the equations:

% recovery (instantaneous)=(diameter immediately post-compression/original diameter)×100.    Equation 1

% recovery (2 minutes)=(diameter at 2 minutes post-compression/original diameter)×100.    Equation 2

Oxygen Transfer Rate (OTR)

Methods to precisely measure oxygen ingress into a closed container are known to the person skilled in the art. According to the present disclosure the MOCON® OX-TRAN® method (Mocon Inc., Minneapolis, USA) as recommended in different standards such as the ASTM (F1307-02) was used.

Example 1—Co-Extruded Closure Having a Core Member and a Peripheral Layer

The sample products were produced on conventional co-extrusion equipment. Core member 22 was produced by employing low density polyethylene (LDPE, from Sabic, Europe), 12.5 wt. % of a fatty acid amide and 5 wt. % or 10 wt. % of cycloolefin-based copolymer (TOPAS® elastomer E-140 from Topas Advanced Polymers, Germany) using an inert gas as physical blowing agent, where amounts given in wt. % are based on the total weight of the core member. The degree of foaming was adjusted so as to produce samples having a density of 241 kg/m$^3$ (0.241 g/cm$^3$), 251 kg/m$^3$ (0.251 g/cm$^3$) or 261 kg/m$^3$ (0.261 g/cm$^3$). In forming peripheral layer 24, a mixture of 50 wt. %, based on the total weight of the peripheral layer, of SEBS polymer) and 50 wt. %, based on the total weight of the peripheral layer, of metallocene polyethylene polymer was employed. Each polymer component of the peripheral layer was supplied to a separate reservoir and fed directly from this reservoir to the extrusion equipment, where the respective peripheral layer polymer components were blended with each other and extruded. In the forming process, peripheral layer 24, having a thickness of 0.5 mm, was formed in the extrusion equipment peripherally surrounding core member 22 and being intimately bonded thereto. The resulting products were cut into lengths suitable for forming bottle closure 20, followed by a chamfer being formed in edges 31 and 32. The resulting closures had a diameter of 23 mm and a length of 38 mm or 44 mm.

Further samples 10 and 11 were prepared in an identical manner, containing respectively 16.5 wt. % fatty acid amide and 20 wt. % SIBS, or 20 wt. % of fatty acid amide and 10 wt. % SIBS and having a core member density of 265 kg/m$^3$ (0.265 g/cm$^3$).

For comparison, samples 1 and 4 were prepared in an identical manner, with the differences that no cycloolefin-based copolymer or SIBS was included in the core member. The details of the products and the comparative products are shown in Table 1. The Mocon test (OTR measurement system using 100% oxygen) showed that the oxygen transfer rate of the respective closures was not impaired by the inclusion of cycloolefin-based copolymer in the core member. The extraction force was also not impaired. At the same time, the compression recovery, in particular at two minutes, was improved compared to samples not comprising a cycloolefin-based copolymer in the core member.

TABLE 1

| Sample | Length | Foam density ($kg/m^3$) | Wt. % cycloolefin-based copolymer | Wt. % SIBS | Instant. % recovery | 2 minute % recovery | OTR (cc/closure/day) | 1 h extraction force | 14 day extraction force |
|---|---|---|---|---|---|---|---|---|---|
| 1 | 38 | 261 | 0 | 0 | 83.1 | 95.04 | — | 219.7 | 257.7 |
| 2 | 38 | 261 | 5 | 0 | 83.5 | 95.60 | — | 210.0 | 236.7 |
| 3 | 38 | 261 | 10 | 0 | 83.7 | 95.88 | — | 219.0 | 245.7 |
| 4 | 44 | 261 | 0 | 0 | 82.6 | 95.10 | 0.012 | 219.3 | 248.3 |
| 5 | 44 | 261 | 5 | 0 | 83.0 | 95.53 | 0.01 | 211.7 | 236.3 |
| 6 | 44 | 261 | 10 | 0 | 83.3 | 95.87 | 0.011 | 216.7 | 234.3 |
| 7 | 38 | 241 | 5 | 0 | 83.1 | 95.49 | — | 216.0 | 253.0 |
| 8 | 38 | 251 | 5 | 0 | 83.2 | 95.67 | — | 207.0 | 250.0 |
| 9 | 44 | 241 | 5 | 0 | 82.5 | 95.32 | 0.008 | 225.0 | 253.0 |
| 10 | 43 | 265 | 0 | 20 | 84.0 | 96.46 | 0.015 | — | — |
| 11 | 43 | 265 | 0 | 10 | 82.9 | 95.15 | 0.014 | — | — |

It can be seen that the compression recovery, in particular the two minute % recovery, is improved in the samples comprising cycloolefin-based copolymer or SIBS, compared to the control samples 1 and 4, without impairment, or even with improvement, of OTR or extraction force.

Example 2—Coextruded Closure Having a Core Member and a Peripheral Layer

The sample products were produced on conventional co-extrusion equipment as described in example 1, with the differences that the LDPE in the core member was replaced by a mixture of 30 wt. % LDPE, 50 wt. % LLDPE, 3 wt. % HDPE, based on the total weight of the core member, samples 13 and 15 did not comprise stearamide, and the degree of foaming was adjusted so as to produce samples having a foam density of 220 $kg/m^3$. The peripheral layer was formed with a thickness of 0.4 mm. The properties of the closures and comparative closures are indicated in Table 2.

TABLE 2

| Sample | Wt. % cycloolefin-based copolymer | Instantaneous % recovery | 2 minute % recovery | OTR (cc/closure/day) |
|---|---|---|---|---|
| 12 | 0 | 83.2 | 92.98 | 0.025 |
| 13 | 10 | 84.6 | 94.54 | 0.021 |
| 14 | 10 | 84.5 | 94.49 | 0.019 |
| 15 | 0 | 84.3 | 94.28 | 0.026 |

It can thus be seen that the closures according to the present disclosure have improved compression recovery compared to closures which do not comprise a cycloolefin-based copolymer, without impairment, or even with improvement of OTR.

The above examples illustrate closures prepared according to the present disclosure by means of extrusion methods and properties thereof. Closures according to the present disclosure can also be prepared by means of injection molding methods as described for example in WO 94/25513 A1, the disclosure of which in respect of injection molding methods is explicitly incorporated herein and forms a part of the present disclosure.

In one aspect the present disclosure provides for a synthetic closure for a product-retaining container constructed for being inserted and securely retained in a portal-forming neck of said container, said closure comprising a) a core member comprising at least one cycloolefin-based copolymer.

According to one aspect of the closure according to the present disclosure, the closure comprises a core member and does not comprise a peripheral layer. This aspect can be advantageous particularly in reducing cost per closure, and simplifying the production.

According to another aspect of the present disclosure, the closure comprises at least one peripheral layer at least partially surrounding and intimately bonded to at least one surface of the core member. According to another aspect of the present disclosure, said peripheral layer comprises at least one thermoplastic polymer. The at least one peripheral layer is generally desirable in attaining a synthetic bottle closure which is suitable as a closure or stopper for the wine industry. The closure may comprise more than one peripheral layer, for example two, three or four peripheral layers.

Due to the operation of the cooperating jaws which are employed to compress the stopper for insertion into the bottle, sharp edges of the jaw members are forced into intimate contact with the outer surface of the stopper. Prior art closures have been known to be incapable of resisting these cutting forces. As a result, longitudinal cuts, score lines or slits can be formed in the outer surface of the stopper, enabling liquid to seep from the interior to the exterior of the bottle. This disadvantage, existing with prior art cork and synthetic closures, can be reduced or even eliminated by incorporating at least one peripheral layer according to the present disclosure. In addition, by forming at least one peripheral layer as disclosed herein, the present disclosure provides a synthetic bottle closure which contributes to reducing or even overcoming the prior art disadvantages.

The present disclosure particularly provides a closure having at least one peripheral layer, particularly an outermost peripheral layer, with a tough, score and mar resistant surface. In this respect, it is advantageous according to this aspect of the present disclosure that said at least one peripheral layer comprises a density in the ranges disclosed herein.

According to a particular aspect of the present disclosure, the cycloolefin-based copolymer is comprised in the core member in an amount in the range of from 0.01 wt. % to 20 wt. %, particularly in an amount in the range of from 0.1 wt. % to 15 wt. %, particularly in an amount in the range of from 0.5 wt. % to 14 wt. %, particularly in an amount in the range of from 1 wt. % to 13 wt. %, in an amount in the range of from 2 wt. % to 12 wt. %, particularly in an amount in the range of from 3 wt. % to 12 wt. %, particularly in an amount in the range of from 4 wt. % to 11 wt. %, particularly in an amount in the range of from 5 wt. % to 10 wt. %, based on the total weight of the core member. The disclosed ranges permit an improvement in the speed with which a secure, sealed engagement of the stopper with the neck of the bottle is achieved after the closure is inserted into the neck of the bottle, without impairment of oxygen permeability properties of the closure.

According to a particular aspect of the present disclosure, in order to assure the advantages of the present disclosure, in particular the achievement of a secure, sealed engagement of the stopper with the neck of the bottle within a desired time frame after the closure is inserted into the neck of the bottle, the cycloolefin-based copolymer has at least one, particularly two, particularly three, particularly four, particularly five, particularly six, particularly seven, particularly all of the properties:

(i) a density measured according to ISO 1183 in the range of from 900 kg/m$^3$ to 1000 kg/m$^3$, particularly in the range of from 905 kg/m$^3$ to 990 kg/m$^3$, particularly in the range of from 910 kg/m$^3$ to 980 kg/m$^3$, particularly in the range of from 915 kg/m$^3$ to 970 kg/m$^3$, particularly in the range of from 920 kg/m$^3$ to 960 kg/m$^3$, particularly in the range of from 930 kg/m$^3$ to 950 kg/m$^3$;

(ii) a Shore A hardness measured according to ISO 868 in the range of from 80 to 100, particularly in the range of from 82 to 98, particularly in the range of from 83 to 96, particularly in the range of from 84 to 95, particularly in the range of from 85 to 94, particularly in the range of from 86 to 93, particularly in the range of from 87 to 92;

(iii) a glass transition temperature in the range of from −10° C. to 10° C., particularly in the range of from −8° C. to 10° C., particularly in the range of from −5° C. to 10° C., particularly in the range of from −2° C. to 10° C., particularly in the range of from 0° C. to 10° C., particularly in the range of from 0° C. to 8° C.;

(iv) a tensile modulus (1 mm/min) measured according to ISO 527-T2/1A at 23° C. in the range of from 35 MPa to 55 MPa, particularly in the range of from 38 MPa to 52 MPa, particularly in the range of from 40 MPa to 50 MPa, particularly in the range of from 42 MPa to 48 MPa;

(v) a tensile strain at break (50 mm/min) measured according to ISO 527-T2/1A in the range of >400%, particularly in the range of from 400% to 550%, particularly in the range of from 410% to 520%, particularly in the range of from 420% to 500%;

(vi) a compression set measured according to ISO 815 at 24 h and 23° C. in the range of from 25% to 40%,%, particularly in the range of from 27% to 40%, particularly in the range of from 29% to 39%, particularly in the range of from 30% to 38%;

(vii) a compression set measured according to ISO 815 at 24 h and 70° C. in the range of from 75% to 95%, particularly in the range of from 80% to 95%, particularly in the range of from 82% to 95%, particularly in the range of from 85% to 95%, particularly in the range of from 86% to 94%, particularly in the range of from 87% to 93%;

(viii) a Vicat softening temperature VST/A50 measured according to ISO 306 in the range of from 60 to 70° C., particularly in the range of from 60° C. to 69° C., particularly in the range of from 61° C. to 68° C., particularly in the range of from 61° C. to 67° C., particularly in the range of from 62° C. to 66° C., particularly in the range of from 63° C. to 65° C.

According to the present disclosure, the cycloolefin-based copolymer can comprise (A1) 20 mol % to 80 mol %, particularly 25 mol % to 75 mol %, particularly 30 mol % to 70 mol %, particularly 35 mol % to 65 mol %, particularly 40 mol % to 60 mol %, of repeating units derived from at least one polymerisable ethylenically unsaturated monomer unit;

(A2) 80 mol % to 20 mol %, particularly 75 mol % to 25 mol %, particularly 70 mol % to 30 mol %, particularly 65 mol % to 35 mol %, particularly 60 mol % to 40 mol %, of repeating units derived from at least one cyclic ethylenically unsaturated monomer unit which is copolymerisable with the at least one linear ethylenic ally unsaturated monomer unit (A1); and (A3) 0 mol % to 10 mol %, particularly 0 mol % to 7 mol %, particularly 0 mol % to 5 mol %, particularly 0 mol % to 3 mol %, of repeating units derived from at least one further ethylenically unsaturated monomer unit and which are copolymerisable with at least one, optionally both, of (A1) and (A2).

The at least one polymerisable ethylenically unsaturated monomer unit (A1) according to the present disclosure may be a branched or linear ethylenically unsaturated monomer unit, in particular a branched or linear $C_2$-$C_8$ ethylenically unsaturated monomer unit, particularly a branched or linear $C_2$-$C_7$ ethylenically unsaturated monomer unit, particularly a branched or linear $C_2$-$C_6$ ethylenically unsaturated monomer unit, particularly a branched or linear $C_2$-$C_5$ ethylenically unsaturated monomer unit, particularly a branched or linear $C_2$-$C_4$ ethylenically unsaturated monomer unit, particularly a branched or linear $C_2$-$C_3$ ethylenically unsaturated monomer unit, particularly a branched or linear $C_2$, $C_3$, $C_4$, $C_5$, $C_6$, $C_7$ or $C_8$ ethylenically unsaturated monomer unit, particularly a branched or linear $C_2$ or $C_3$ ethylenically unsaturated monomer unit, which may be substituted with from 1 to 4 substituents, particularly 1, 2, 3 or 4 substituents, selected from linear $C_1$-$C_8$ alkyl groups, particularly linear $C_1$, $C_2$, $C_3$, $C_4$, $C_5$, $C_6$, $C_7$ or $C_8$ alkyl groups, branched $C_1$-$C_8$ alkyl groups, particularly branched $C_1$, $C_2$, $C_3$, $C_4$, $C_5$, $C_6$, $C_7$ or $C_8$ alkyl groups, $C_6$-$C_{18}$ aryl groups, particularly $C_6$, $C_7$, $C_8$, $C_9$, $C_{10}$, $C_{11}$, $C_{12}$, $C_{13}$, $C_{14}$, $C_{15}$, $C_{16}$, $C_{17}$ or $C_{18}$ aryl groups. Linear ethylenically unsaturated monomer units (A1), in particular $C_2$-$C_8$ α-olefin are particularly advantageous according to the present disclosure. According to a particular aspect of the cycloolefin-based copolymer of the present disclosure, the at least one polymerisable, linear ethylenically unsaturated monomer unit (A1) is an α-olefin, particularly a $C_2$-$C_8$ α-olefin, particularly a linear $C_2$-$C_8$ α-olefin, particularly a linear $C_2$, $C_3$, $C_4$, $C_5$, $C_6$, $C_7$ or $C_8$ α-olefin, which is optionally substituted with from 1 to 4 substituents selected from linear $C_1$-$C_8$ alkyl groups, branched $C_1$-$C_8$ alkyl groups, $C_6$-$C_{18}$ aryl groups. Ethylenically unsaturated monomer units (A1) are particularly selected from ethylene, prop-1-ene, but-1-ene, pent-1-ene, hex-1-ene, hept-1-ene, oct-1-ene, which may be substituted with from 1 to 4 substituents selected from linear $C_1$-$C_8$ alkyl groups, branched $C_1$-$C_8$ alkyl groups, $C_6$-$C_{18}$ aryl groups. Ethylenically unsaturated monomer units (A1) are more particularly selected from ethylene, prop-1-ene and but-1-ene, yet more particularly selected from ethene and prop-1-ene. According to a particular aspect of the present disclosure the ethylenically unsaturated monomer units (A1) are ethylene.

According to a further aspect of the present disclosure, the at least one cyclic ethylenically unsaturated monomer unit (A2) is selected from the group consisting of norbornene, alkyl substituted norbornene, vinyl norbornene, norbornadiene, tetracyclododecene, which may be substituted with one, two, three, four five or six substituents selected from the group consisting of linear $C_1$-$C_8$ alkyl groups, branched $C_1$-$C_8$ alkyl groups, $C_6$-$C_{18}$ aryl groups, $C_7$-$C_{20}$ alkylene aryl groups, $C_2$-$C_{20}$ cyclic alkenyl groups, $C_2$-$C_{20}$ non-cyclic alkenyl groups, halogen, hydroxyl, ester group, alkoxy group, carboxy group, cyano group amido group, imido group, silyl group.

According to a further aspect of the cycloolefin-based copolymer of the present disclosure, the proportion of repeating units (A2) being present in the form of dimer is not more than 50 mol % and the proportion of repeating units (A2) being present in the form of trimer is not less than 5 mol %. The term "dimer" in this context refers to a unit in which two individual repeating units (A2) are bound to each other through reaction of their ethylenically unsaturated bonds, this unit then being incorporated intact into the copolymer chain. The term "trimer" in this context refers to a unit in which three individual repeating units (A2) are bound to each other through reaction of their ethylenically unsaturated bonds, this unit then being incorporated intact into the copolymer chain.

According to a particular aspect of the present disclosure, the cyclic olefin copolymer is a copolymer of ethylene and norbornene.

Suitable cycloolefin copolymers, as well as methods for their synthesis and characterization, are described in U.S. Pat. No. 8,063,163 B2, the contents of which in relation thereto are incorporated herein by reference and form a part of the present disclosure. A particularly suitable cycloolefin copolymer is commercially available under the name TOPAS® Elastomer E-140 from Topas Advanced Polymers, Germany.

In addition to the use of at least one cycloolefin-based copolymer, or alternative thereto, the objects of the present disclosure can be attained by a core member which is formed from a composition comprising at least one isobutylene-based block copolymer. The details regarding the amount and physical and/or performance properties of the at least one isobutylene-based block copolymer can, for example, be the same as the details disclosed herein for the at least one cycloolefin-based copolymer. In one aspect, the isobutylene-based block copolymer can have a number average molecular weight in the range of from about 30,000 to 500,000, particularly in the range of from about 50,000 to about 400,000.

The at least one isobutylene-based block copolymer is particularly a copolymer comprising (i) a polymer block whose main component is isobutylene and (ii) a polymer block formed from at least one cationic comonomer whose main component is other than isobutylene and which is copolymerizable with the polymer block (i) whose main component is isobutylene. The at least one cationic polymerizable comonomer (ii) may be, for example, selected from the groups consisting of aliphatic olefins, aromatic vinyls, dienes, vinyl ethers, silanes, vinylcarbazole, β-pinene, acenaphthylene and combinations of two or more thereof, for example combinations of two, three or four thereof. Suitable aliphatic olefins are, for example, ethylene, propylene, 1-butene, 2-methyl-1-butene, 3-methyl-1-butene, pentene, hexane, cyclohexene, 4-methyl-1-pentene, vinylcyclohexane, octane, norbornene and the like. Suitable aromatic vinyl comonomers are, for example, styrene, o-, m-, or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-, m- or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m- or p-t-butyl styrene, o-, m- or p-methoxy styrene, o-, m- or p-chloromethylstyrene, o-, m- or p-bromomethylstyrene, styrene derivatives substituted by silyl group, indene, vinylnaphthalene, and the like. Suitable diene comonomers are butadiene, isoprene, hexadiene, cyclopentadiene, cyclohexadiene, dichloropentadiene, divinylbenzene, ethylidene norbornene and the like. Suitable vinyl ether comonomers are, for example, methyl vinyl ether, ethyl vinyl ether, n-propyl vinyl ether, isopropyl vinyl ether, (n-, sec-, tert-, iso-) butyl vinyl ether, methyl propenyl ether, ethyl propenyl ether and the like. Suitable silane compounds are, for example, vinyl trichlorosilane, vinyl methyldichlorosilane, vinyl dimethylchlorosilane, vinyl dimethylmethoxysilane, vinyl trimethylsilane, divinyldichlorosilane, divinyl dimethoxysilane, divinyl dimethoxysilane, divinyldimethylsilane, 1,3-divinyl-1,1,3,3-tetramethyldisiloxane, trivinylmethylsilane, γ-methylsilane, γ-methacryloyloxypropyltrimethoxysilane, γ-methacryloyl oxypropylmethyldimethoxysilane and the like.

According to a particular aspect, the comonomer component (ii) in which isobutylene is not the main component comprises at least one aromatic vinyl comonomer. The at least one aromatic vinyl comonomer is particularly selected from the group of styrene, α-methylstyrene, p-methylstyrene, and indene. In terms of cost, using styrene, α-methylstyrene, or these mixtures are particularly preferable.

The monomer component in the present disclosure in which isobutylene is the main component may or may not contain a monomer other than isobutylene. Normally, the isobutylene in this monomer content is 60% or more, optionally 80% or more. The other monomer is not specifically limited, as long as it is a cationic polymerizable monomer like exemplified above.

The isobutylene-based block copolymer in the present disclosure is not particularly limited, provided that it comprises a polymer block comprising isobutylene as the main component and a polymer block formed from a comonomer component in which isobutylene is not the main component. For example, the isobutylene-based block copolymer may be a straight, branched, or asteroid structure block copolymer, diblock copolymer, triblock copolymer, or multiblock copolymer. Some particular block copolymers are a block copolymer comprising an aromatic vinyl comonomer as the main component, a block copolymer comprising an isobutylene as the main component, and a triblock copolymer formed from a block copolymer comprising an aromatic vinyl comonomer as the main component. They may be used solely or two or more of them may be used in combination, to obtain the intended performance and processing properties.

The ratio between the polymer block comprising an isobutylene as the main component and the polymer block formed from a comonomer component in which isobutylene is not the main component is not specifically limited. In a particular aspect, the polymer block comprising isobutylene as the main component can be comprised in an amount of from 95 to 40% by weight, and the polymer block formed from a monomer component in which isobutylene is not the main component can be comprised in an amount of from 5 to 60% by weight. Particularly, the former polymer block can be comprised in an amount of from 90 to 60% by weight and the latter polymer block can be comprised in an amount of from 10 to 40% by weight.

According to a particular aspect of the present disclosure, the at least one isobutylene-based block copolymer is a styrene-isobutylene-styrene block copolymer, also referred to in the following as "SIBS." SIBS is commercially available, for example under the trade name SIBSTAR® from Kaneka Corporation, Osaka, Japan.

The closure of the present disclosure particularly comprises at least one peripheral layer intimately bonded to substantially the entire substantially cylindrical surface of the core member. If any large unbonded areas exist, flow paths for gas and liquid could result. Consequently, secure, intimate, bonded interengagement of the at least one peripheral layer with the core member is advantageous for attaining a bottle closure for the wine industry.

In order to achieve integral bonded interconnection between the at least one peripheral layer, if present, and the core member, the at least one peripheral layer is formed about the core member in a manner which assures intimate bonded engagement. The closure according to the present disclosure, in particular the core member according to the present disclosure, can be formed, for example by extrusion, or by injection molding.

According to one aspect of the present disclosure whereby the closure comprises at least one peripheral layer, the desired secure, intimate, bonded, interengagement is attained either by simultaneous co-extrusion of the at least one peripheral layer and the core member, or by applying the at least one peripheral layer to the core member after the core member has been formed. By employing either process, intimate bonded interengagement of the at least one peripheral layer to the core member is attained.

According to one aspect of the present disclosure, therefore, the closure is formed by a process comprising at least a process step of extrusion. Either the core member, or at least one peripheral layer, if present, or both, can be formed by extrusion. Alternatively, for example, the core member can be formed by injection molding and at least one peripheral layer can be formed by extrusion, or the core member can be formed by extrusion or by injection molding and at least one peripheral layer can be formed by heating, dipping, spraying, or by any other process known to the skilled person and appearing suitable for forming a peripheral layer for a closure according to the present disclosure.

In a particular aspect of the present disclosure, the synthetic closure is produced by a process comprising at least a process step of coextrusion. According to this aspect of the disclosure, the synthetic closure comprises a core member and at least one peripheral layer, which are formed by co-extrusion. Suitable co-extrusion methods are known to the skilled person. Co-extrusion allows an advantageous bonding of the peripheral layer to the core member.

In one aspect of the present disclosure, said core member and said at least one peripheral layer are extruded substantially simultaneously.

In another aspect of the present disclosure, said core member is extruded separately or formed by injection molding, and subsequent thereto at least one peripheral layer is formed in extrusion equipment peripherally surrounding and enveloping the pre-formed core member.

In further aspects of the disclosed closure, comprising two or more peripheral layers, it is possible that a first peripheral layer which is in secure, intimate, bonded, interengagement with the outer cylindrical surface of the core member is formed by either substantially simultaneous extrusion with the core member, or by subsequent extrusion, as described herein. A second and subsequent peripheral layers can then be formed likewise by either substantially simultaneous extrusion with the core member and the first or further peripheral layers, or by subsequent extrusion, as described herein for the first peripheral layer. With multiple peripheral layers it is also possible that two or more peripheral layers are extruded subsequently, as described herein, but substantially simultaneously with each other.

According to a further aspect of the closure of the present disclosure, the closure is formed by a process comprising at least a process step of molding, particularly at least a process step of injection molding. If one or more peripheral layers are present, at least one peripheral layer is formed by one or more of the methods outlined above.

The core member comprises a plurality of cells. Such a plurality of cells can be achieved, for example, in a foamed material, also referred to as a foam or as a foamed plastic. The closure according to the present disclosure particularly comprises at least one foamed material. In a particular aspect of the method, the core member comprises a foamed material. The peripheral layer can also comprise a plurality of cells, for example in the form of an at least partially foamed material. However, the at least one peripheral layer, if present, is formed with a substantially greater density than the core material, in order to impart desired physical characteristics to the synthetic bottle closure of the present disclosure. According to an exemplary aspect of the method according to the present disclosure, the core member is foamed and the at least one peripheral layer, if present, is substantially not foamed, particularly not foamed. It is also conceivable for the peripheral layer, if present, to be foamed, for example by means of a small amount of foaming agent or expandable microspheres in the peripheral layer, for example to make it more flexible. However, even if it is foamed, the peripheral layer advantageously still has a higher density than the core member. It is advantageous that the cell size and/or cell distribution in the foam, particularly in the core member, are substantially uniform throughout the entire length and/or diameter of the foamed material, particularly are substantially uniform throughout the entire length and/or diameter of the core member. In this way closures with substantially uniform properties, such as, for example OTR, compressibility and compression recovery, can be provided. According to a particular aspect of the synthetic closure disclosed herein, therefore, at least one of the size and the distribution of the plurality of cells in the core member is substantially uniform throughout at least one of the length and the diameter of the core member.

The plurality of cells of the disclosed closure is further advantageously defined as being a plurality of substantially closed cells, or that the foam is a substantially closed cell foam. In particular, the core member is exemplarily defined as comprising substantially closed cells. Closed cell foams are generally defined as comprising cells, also referred to as pores, which are substantially not interconnected with each other. Closed cell foams have higher dimensional stability, lower moisture absorption coefficients, and higher strength compared to open-cell-structured foams.

It is therefore a particular aspect of the synthetic closure disclosed herein that the plurality of cells is a plurality of substantially closed cells.

In order to assure that the core member of the closure possesses inherent consistency, stability, functionality and capability of providing long-term performance, the cell size of the core material is particularly substantially homogeneous throughout its entire length and diameter. According to a particular aspect of the synthetic closure disclosed herein, the plurality of cells comprises a cell size in a range of from about 0.025 mm to about 0.5 mm, in particular from about 0.05 mm to about 0.35 mm. The cell size is measured according to standard test methods known to the skilled person.

In another exemplary aspect of the present disclosure, the core member comprises closed cells having at least one of closed cells having an average cell size ranging from about 0.02 millimeters to about 0.50 millimeters and a cell density ranging from about 8,000 cells/cm$^3$ to about 25,000,000 cells/cm$^3$. Although this cell configuration has been found to produce a highly effective product, it has been found that even more advantageous products are those wherein said core member comprises at least one of an average cell size ranging from about 0.05 mm to about 0.1 mm and a cell density ranging from about 1,000,000 cells/cm$^3$ to about 8,000,000 cells/cm$^3$.

In order to control the cell size in the core member of the closure, and attain the desired cell size detailed above, a nucleating agent can be employed. In a particular embodiment, it has been found that by employing a nucleating agent selected from the group consisting of calcium silicate, talc, clay, titanium oxide, silica, barium sulfate, diatomaceous earth, and mixtures of citric acid and sodium bicarbonate, the desired cell density and cell size is achieved.

As is well known to the skilled person, a blowing agent can be employed in forming extruded material, for example extruded foam plastic material, or molded material, for example injection molded material, such as are advantageous for the core member. In the present disclosure, a variety of blowing agents can be employed during the extrusion or molding whereby the core member is produced. Typically, either physical blowing agents or chemical blowing agents are employed. Suitable blowing agents that have been found to be efficacious in producing the core member of the present disclosure comprise one or more selected from the group consisting of: aliphatic hydrocarbons having 1-9 carbon atoms, halogenated aliphatic hydrocarbons having 1-9 carbon atoms and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons and fluorinated hydrocarbons they include, for example, methylfluoride, perfluoromethane, ethyl fluoride, 1,1-difluoroethane (HFC-152a), 1,1,1-trifluoroethane (HFC-430a), 1,1,1,2-tetrafluoroethane (HFC-134a), pentafluoroethane, perfluoroethane, 2,2-difluoropropane, 1,1,1-trifluoropropane, perfluoropropane, perfluorobutane, perfluorocyclobutane. Partially hydrogenated chlorocarbon and chlorofluorocarbons for use in this disclosure include methyl chloride, methylene chloride, ethyl chloride, 1,1,1-trichlorethane, 1,1-dichloro1-fluoroethane (HCFC-141b), 1-chloro1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromenthane (CFC11), dichlorodifluoromenthane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol and isopropanol. Chemical blowing agents include azodicarbonamic, azodiisobutyronitride, benzenesulfonhydrazide, 4,4-oxybenzene sulfonylsemicarbazide, p-toluene sulfonylsemicarbazide, barium azodicarboxlyate, N,N'-Dimethyl-N,N'-dinitrosoterephthalamide, trihydrazinotriazine, and hydrocerol.

In a particular aspect, inorganic, or physical, blowing agents are used in making the core member according to the present disclosure. Examples of inorganic blowing agents include carbon dioxide, water, air, helium, nitrogen, argon, and mixtures thereof. Carbon dioxide and nitrogen are particularly useful blowing agents.

Expandable microspheres can also be considered as blowing agent according to the present disclosure.

According to another exemplary embodiment of the present disclosure, in order to produce the desired product, the blowing agent may be incorporated into the plastic material in a quantity ranging from about 0.005% to about 10% by weight of the weight of the plastic material. The term "plastic material" refers to the material from which at least one of the core member and the peripheral layer is formed, in particular the thermoplastic polymer or combination of thermoplastic polymers from which at least one of the core member and the peripheral layer is formed.

The closure according to the present disclosure particularly has a substantially cylindrical shape comprising substantially flat terminating surfaces forming the opposed ends of said closure and the substantially flat terminating surfaces of the core member are substantially devoid of the peripheral layer. The closure has a substantially cylindrical form comprising a substantially cylindrical peripheral surface and two substantially flat terminating faces at the opposing ends of the cylindrical form. In addition to a core member which possesses a construction with physical characteristics similar to natural cork, and has a substantially cylindrical form with a substantially cylindrical peripheral surface, the closure of the present disclosure can comprise at least one peripheral layer at least partially surrounding and intimately bonded to at least one surface, particularly the substantially cylindrical surface, of the core member. The ends of the closure can be beveled or chamfered, as is known to the skilled person. Although any desired bevel or chamfered configuration can be employed, such as a radius, curve, or flat surface, it has been found that merely cutting the terminating ends at the intersection with the longitudinal cylindrical surface of the elongated length of material, with or without at least one peripheral layer as described herein, at an angle in the range of from about 30° to about 75°, for example in the range of from about 35° to about 70°, particularly in the range of from about 40° to about 65°, allows formation of a closure which is easier to insert into the neck of a container. Angles of about 45°, 46°, 47°, 48°, 49°, 50°, 51°, 52°, 53°, 54°, 55°, 56°, 57°, 58°, 59° or 60° have been found particularly to contribute to the present disclosure. The bevel or chamfer angle is measured relative to the longitudinal axis of the cylindrical closure. The chamfer angle for a closure for a still wine bottle is particularly within the above ranges, particularly with a chamfer length in the range of from about 0.4 mm to about 2.5 mm, particularly in the range of from about 0.5 mm to about 2.0 mm. Closures for sparkling wine bottles advantageously have a chamfer in the above range, but generally have a deeper and/or longer chamfer than closures for still wine bottles, for example having a chamfer angle in the range of from about 35° to about 55°, particularly in the range of from about 40° to about 50°, more particularly a chamfer angle of about 40°, 41°, 42°, 43°, 44°, 45°, 46°, 47°, 48°, 49° or 50°, and/or a chamfer length in the range of from about 3 mm to about 8 mm, particularly in the range of from about 4 mm to about 7 mm, particularly a chamfer length of about 3 mm, 4 mm, 5 mm, 6 mm, 7 mm or 8 mm.

In an exemplary aspect of the present disclosure the core member of the present disclosure comprises, in addition to at least one cycloolefin copolymer, at least one thermoplastic polymer, copolymer, or homopolymer, or a combination of one or more thereof. The at least one thermoplastic polymer, copolymer, or homopolymer, or combination of one or more thereof can be in the core member in the form of extruded, foamed, thermoplastic polymer, copolymer, or homopolymer, or a combination of one or more thereof. In an alternative aspect of the present disclosure the at least one thermoplastic polymer, copolymer, or homopolymer, or combination of one or more thereof, can be in the form of molded, particularly injection molded, foamed, thermoplastic polymer, copolymer, or homopolymer, or a combination of one or more thereof. Although any known thermoplastic polymeric material, particularly any foamable thermoplastic polymeric material can be employed in the closure of the present disclosure, the thermoplastic plastic material must be selected for producing physical properties similar to natural cork, so as to be capable of providing a synthetic closure for replacing natural cork as a closure for wine bottles. By way of example, the thermoplastic plastic material for the core member can be a closed cell plastic material.

According to an exemplary aspect of the method according to the present disclosure, said closure particularly comprises one or more thermoplastic polymers. Particularly at least one, particularly both of the core material and the material of the at least one peripheral layer, if present, comprise one or more thermoplastic polymers. In an exemplary aspect, the at least one peripheral layer, if present, comprises a thermoplastic polymer identical or similar to the thermoplastic polymer comprised in the core member. A peripheral layer can, on the other hand, comprise a thermoplastic polymer which is different to the thermoplastic polymer or thermoplastic polymers comprised in the core member. However, as detailed herein, the physical characteristics imparted to the peripheral layer particularly differ substantially from the physical characteristics of the core member, in particular the peripheral layer density is greater than the core member density.

In a particular aspect of the present disclosure the core member comprises, in addition to the cycloolefin copolymer or SIBS as disclosed herein, at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers and mixtures thereof. If a polyethylene is employed, in an exemplary aspect of the method disclosed herein the polyethylene comprises one or more polyethylenes selected from the group consisting of high density, medium density, low density, linear low density, ultra high density, and medium low density polyethylenes. Particularly useful plastic materials for the core element can be polyethylene, in particular LDPE, LLDPE, HDPE and/or ethylene-vinyl-acetate copolymer (EVA). These materials can be used alone or in combination with one or more other thermoplastic polymers disclosed herein, in particular with metallocene PE or metallocene PP, particularly with metallocene PE. Exemplary polyethylene materials which can be used alone or in combination with each other or with other polymers or copolymers in the core member are commercially available and known to the skilled person. In a particular aspect at least one polymer or copolymer, in particular at least one polyethylene, which can be used in the closure of the present disclosure, can be derived from sustainable or renewable resources such as, for example, sugar cane, sugar beet or wheat grain, generally via bioethanol as intermediate. It is also possible for polymers referred to herein as polyethylene, for example LDPE, LLDPE or HDPE, to be copolymers with one or more further olefins, in particular one or more α-olefins, for example prop-1-ene, but-1-ene or pent-1-ene, in order to attain desired properties. In a particular aspect, if HDPE is used, this particularly has at least one, particularly two, particularly all three of the properties: a density measured according to ASTM D-792 of greater than 0.941 g/cm$^3$, particularly in the range of from 0.945 g/cm$^3$ to 0.970 g/cm$^3$, particularly in the range of from 0.950 g/cm$^3$ to 0.965 g/cm$^3$, particularly in the range of from 0.955 g/cm$^3$ to 0.965 g/cm$^3$, particularly 0.955 g/cm$^3$, 0.956 g/cm$^3$, 0.957 g/cm$^3$, 0.958 g/cm$^3$, 0.959 g/cm$^3$, 0.960 g/cm$^3$, 0.961 g/cm$^3$, 0.962 g/cm$^3$, 0.963 g/cm$^3$, 0.964 g/cm$^3$, or 0.956 g/cm$^3$; a Melt Flow Index measured according to ASTM D-1238 at 190° C./2.16 kg in the range of from 4 g/10 min to 15 g/10 min, particularly in the range of from 5 g/10 min to 12 g/10 min, particularly in the range of from 6 g/10 min to 11 g/10 min, particularly in the range of from 7 g/10 min to 10 g/10 min, particularly 7 g/10 min, 8 g/10 min, 9 g/10 min or 10 g/10 min; a Vicat softening temperature measured according to ASTM D-1525 on a test specimen prepared from compression molded sheet made according to ASTM D-1928—procedure C in the range of from 100° C. to 150° C., particularly in the range of from 110° C. to 140° C., particularly in the range of from 120° C. to 130° C., particularly 120° C., 121° C., 122° C., 123° C., 124° C., 125° C., 126° C., 127° C., 128° C., 129° C. or 130° C. In a particular aspect, if LLDPE is used, this particularly has at least one, particularly both of the properties: a density measured according to ASTM D-792 in the range of from 0.915 g/cm$^3$ to 0.925 g/cm$^3$, particularly in the range of from 0.915 g/cm$^3$ to 0.922 g/cm$^3$, particularly in the range of from 0.915 g/cm$^3$ to 0.920 g/cm$^3$, particularly 0.915 g/cm$^3$, 0.916 g/cm$^3$, 0.917 g/cm$^3$, 0.918 g/cm$^3$, 0.919 g/cm$^3$ or 0.920 g/cm$^3$; a Melt Flow Index measured according to ASTM D-1238 at 190° C./2.16 kg in the range of from 0.5 g/10 min to 6.0 g/10 min, particularly in the range of from 0.8 g/10 min to 5.0 g/10 min, particularly in the range of from 1.0 g/10 min to 4.5 g/10 min, particularly in the range of from 1.5 g/10 min to 4.0 g/10 min, particularly in the range of from 2.0 g/10 min to 3.5 g/10 min, particularly 2.0 g/10 min, 2.1 g/10 min, 2.2 g/10 min, 2.3 g/10 min, 2.4 g/10 min, 2.5 g/10 min, 2.6 g/10 min, 2.7 g/10 min, 2.8 g/10 min, 2.9 g/10 min, 3.0 g/10 min or 3.1 g/10 min, 3.2 g/10 min, 3.3 g/10 min, 3.4 g/10 min and 3.5 g/10 min.

Expandable microspheres of one or more of these thermoplastic polymers can also be considered according to the present disclosure. Expandable microspheres are microscopic spheres comprising a thermoplastic shell encapsulating a low boiling point liquid hydrocarbon. When heated to a temperature high enough to soften the thermoplastic shell, the increasing pressure of the hydrocarbon causes the microsphere to expand. The volume can increase by 60 to 80 times.

The at least one thermoplastic polymer, copolymer, homopolymer, or combination of one or more thereof, can be comprised in the core member of the present disclosure in an amount in the range of from 50 wt. % to 99.99 wt. %, particularly in an amount in the range of from 60 wt. % to 99 wt. %, particularly in an amount in the range of from 70 wt. % to 95 wt. %, particularly in an amount in the range of from 80 wt. % to 90 wt. %, based on the total weight of the core member.

According to another aspect of the present disclosure, the core member may further comprise at least one of at least one fatty acid and at least one fatty acid derivative. In order to achieve this, one or more fatty acid derivatives can be added to the at least one thermoplastic polymer which is used to prepare the core member. Exemplary fatty acid derivatives according to the present disclosure are fatty acid esters or fatty acid amides such as stearamides. Suitable fatty acid derivatives are described in published patent application WO 2010/092046 A1, whose specific disclosure in this regard forms part of the present disclosure. The addition of at least one fatty acid derivative to the polymer composition of the synthetic closure imparts superior properties to the synthetic closure. In particular, it has been found that the oxygen transfer rate of the closure can be reduced substantially, thus further reducing unwanted oxidation of wine. In addition, it has been found that the use of a fatty acid derivative as additive does not have a negative impact on the performance characteristics of synthetic corks such as extraction force, ovality control, diameter control and length control. However, some fatty acid derivatives can in principle increase the hardness or stiffness of the closure according to the present disclosure, which can in turn affect negatively the compression recovery properties of the closure. In order to impart the desired OTR-reducing effect to the closure, the fatty acid derivative, if present, is used according to an exemplary aspect of the present disclosure in a concentration from about 0.01 wt. % to about 10 wt. %, in particular from about 0.1 wt. % to about 5 wt. %, more particularly from about 1 wt. % to about 3 wt. %, based on the total weight of the core member.

Further components, for example additives or components which improve desired properties of the closure, which aid processing of the closure and/or its components, or which confer a desired appearance to the closure, can be present in the core member according to the present disclosure, as detailed herein, in a total combined amount in the range of from 0 to 15 wt. %, particularly in the range of from 0.5 wt. % to 12 wt. %, particularly in the range of from 1 wt. % to 10 wt. %.

Regardless of the thermoplastic polymer or thermoplastic polymers selected for forming the core member, in a further exemplary embodiment of the method according to the present disclosure, said core member is further defined as comprising a density ranging from about 100 kg/m$^3$ to about 600 kg/m$^3$. Although this density range has been found to provide an effective core member, according to an exemplary aspect of the present disclosure the density ranges from about 100 kg/m$^3$ to about 500 kg/m$^3$, in particular from about 150 kg/m$^3$ to about 420 kg/m$^3$, more particularly from about 200 kg/m$^3$ to about 350 kg/m$^3$.

According to an exemplary aspect of the present disclosure the peripheral layer comprises at least one thermoplastic polymer selected from the group consisting of polyethylenes, metallocene catalyst polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers and combinations of two or more thereof.

According to an exemplary aspect of the present disclosure said at least one peripheral layer is further defined as comprising one selected from the group consisting of foamed plastics and non-foamed plastics, advantageously having a substantially greater density than the core member, in order to impart desired physical characteristics to the synthetic bottle closure of the present disclosure. In particular, the composition employed for the at least one peripheral layer is particularly selected to withstand the compression forces imposed thereon by the jaws of the corking machine. However, many different polymers, as detailed herein, are able to withstand these forces and, as a result, can be employed for the at least one peripheral layer.

In exemplary aspects of the method according to the present disclosure, the at least one peripheral layer, if present, comprises one or more materials selected from foamable thermoplastic polyurethanes, non-foamable thermoplastic polyurethanes, thermoplastic polyolefins, thermoplastic vulcanizates, EPDM rubber, polyolefins, particularly flexible polyolefins, particularly polyethylenes and polypropylenes, particularly metallocene polyethylenes and polypropylenes, fluoroelastomers, fluoropolymers, fluorinated polyolefins, particularly partially fluorinated or perfluorinated polyethylenes, particularly polytetrafluoroethylenes, olefin block copolymers, styrene block copolymers, for example styrene butadiene block copolymers, for example styrene ethylene butadiene styrene block copolymers, sometimes referred to as SEBS, thermoplastic elastomers, polyether-type polyurethanes and mixtures or blends thereof. Particular examples of the plastic material for the at least one peripheral layer are polyethylene, polypropylene, EPDM rubber, styrene block copolymers, and mixtures or blends thereof. If desired, the at least one peripheral layer can be formed from a transparent material. Furthermore, the material selected for the at least one peripheral layer may be different from that of the core member.

In order to form synthetic bottle closures with all of the desirable inherent physical and chemical properties detailed above, it has been found advantageous to comprise metallocene catalyst polyethylene in at least one peripheral layer, if present. As detailed herein, at least one peripheral layer may comprise substantially metallocene catalyst polyethylene as single component or, if desired, the metallocene catalyst polyethylene may be combined with one or more thermoplastic elastomers, particularly with one or more thermoplastic elastomers as detailed above. In this regard, it has been found advantageous that at least one peripheral layer particularly comprises one or more polyethylenes selected from the group consisting of medium density polyethylenes, medium low density polyethylenes, and low density polyethylenes in an amount in the range of from about 5% to about 100% by weight, particularly in the range of from about 15% to about 95% by weight, particularly in the range of from about 25% to about 90% by weight, based upon the weight of the entire composition A formulation which has been found to be highly effective in providing a peripheral layer comprises at least one styrene block copolymer. Suitable styrene block copolymers which come into consideration can be selected from the group consisting of styrene ethylene butadiene styrene block copolymers, styrene ethylene butylene styrene block copolymers, styrene ethylene butylene block copolymers, styrene butadiene styrene block copolymers, styrene butadiene block copolymers, styrene isobutylene block copolymers, styrene isoprene styrene block copolymers, styrene isoprene block copolymers, styrene ethylene propylene styrene block copolymers, styrene ethylene propylene block copolymers and combinations of two or more thereof. In particular aspects of the present disclosure, the at least one styrene block copolymer is selected from the group consisting of styrene ethylene butadiene styrene block copolymers, styrene ethylene butylene styrene block copolymers, styrene ethylene propylene styrene block copolymers, styrene ethylene propylene block copolymers and combinations of two or more thereof. Examples of commercially available styrene block copolymers according to the present disclosure are SBS, SIS, SEBS, SIBS, SEPS, SEEPS, MBS, which are available, for example under the trade names STRYOFLEX® and STYROLUX® (BASF Corporation of Wyandotte, Mich., USA), Septon® (Kuraray America, Inc., Houston, Tex., USA), MAXELAST® TPE (Nantong Polymax Elastomer Technology Co., Ltd), GLOBALPRENE® Polymers (LCY Chemical Corporation), ELEXAR® and MONPRENE® (Teknor Apex Company), ELASTOCON® series (Elastocon TPE Technologies, Inc.), TPR (Washington, Pa.), EVOPRENE™ (Alpha Gary), VERSAFLEX®, ONFLEX®, VERSALLOY®, VERSOLLAN®, DYNAFLEX® (GLS Thermoplastic Elastomers), SEVRENE™ (Vichem Corporation), VECTOR™ (Dexco Polymers LP), CALPRENE® and SOLPRENE® (Dynasol), MULTIFLEX® TEA and MULTIFLEX® TPE (Multibase, Inc.), EUROPRENE® Sol T (Polimeri Europe), SUNPRENE™ (PolyOne), LEOSTOMER® (Riken Technos Corporation), RTP 2700 and 6000 series (RTP), INVISION® (A. Schulman), DRYFLEX® (VTC Elastotechnik), QUINTAC® (Zeon), MEGOL® and RAPLAN® (API spa), ASAPRENE™ and TUFPRENE™ (Asahi Kasei), Lifoflex (Müller Kunststoffe, Germany), THERMOLAST® (Kraiburg TPE GmbH & Co. KG, Waldkraiberg, Germany) or KRATON®, for example KRATON® D, KRATON® G or KRATON® FG (Kraton Polymers, Houston, Tex., USA).

Another formulation which has been found to be highly effective in providing a peripheral layer comprises at least one thermoplastic vulcanizate.

Another formulation which has been found to be highly effective in providing a peripheral layer which provides at least one, particularly more than one, particularly almost all or even all physical and chemical attributes to attain a commercially viable closure comprises at least one of at least one polyether-type thermoplastic polyurethane and at least one olefin block copolymer or a blend of at least two thereof.

Each of the materials disclosed as suitable for a peripheral layer can be used alone or in combination with one or more of these materials. By employing this material or these materials and forming the material or the materials in peripheral, surrounding, bonded engagement with any desired foamed core member, a highly effective, multi-layer closure is attained which is able to provide at least one, particularly more than one, particularly almost all or even all properties suitable for a wine bottle closure.

In an exemplary construction of this embodiment, the particular polyether-type thermoplastic polyurethane employed for forming the at least one peripheral layer comprises ELASTOLLAN® LP9162, manufactured by BASF Corporation of Wyandotte, Mich. (US). This compound has been found to produce an outer layer in combination with the core member which provides at least one, particularly more than one, particularly almost all or even all of the physical and chemical characteristics suitable for attaining a highly effective closure for the wine industry.

In another exemplary aspect of the present disclosure, the peripheral layer comprises thermoplastic vulcanizates (TPV). Such thermoplastic vulcanizates are well known in the art and are commercially available, for example, under the tradename SANTOPRENE® from ExxonMobil Chemical Company of Houston, Tex. (US), SARLINK® from Teknor Apex B.V., Geleen (NL) or ONFLEX® from PolyOne Inc. of Avon Lake, Ohio (US).

In addition to employing the polyether-type thermoplastic polyurethane detailed above, another composition that has been found to be highly effective in providing at least one, particularly more than one, particularly almost all or even all of the desirable attributes for at least one peripheral layer is a blend of at least one polyolefin, particularly at least one thermoplastic polyolefin and at least one thermoplastic vulcanizate. In the exemplary aspect, the blend of at least one thermoplastic polyolefin and at least one thermoplastic vulcanizate comprises the thermoplastic polyolefin in an amount in the range of from about 10% to about 90% by weight, particularly in an amount in the range of from about 20% to about 80% by weight, particularly in an amount in the range of from about 30% to about 70% by weight, particularly in an amount in the range of from about 40% to about 60% by weight, based upon the weight of the entire composition of and the thermoplastic vulcanizate in an amount in the range of from about 90% to about 10% by weight, particularly in an amount in the range of from about 80% to about 20% by weight, particularly in an amount in the range of from about 70% to about 30% by weight, particularly in an amount in the range of from about 60% to about 50% by weight, based upon the weight of the entire composition. The construction of a closure using a peripheral layer formed from this blend provides a closure which is highly suitable for use as a wine bottle closure.

A further composition that has been found to be highly effective in providing at least one, particularly more than one, particularly almost all or even all of the desirable attributes for at least one peripheral layer is a blend of at least one polyolefin, particularly at least one thermoplastic polyolefin, and at least one styrene block copolymer, or a blend of at least one thermoplastic vulcanizate and at least one styrene block copolymer. In the exemplary aspect, the blend of at least one polyolefin or at least one thermoplastic vulcanizate and at least one styrene block copolymer comprises the polyolefin or the thermoplastic vulcanizate in an amount in the range of from about 5% to about 95% by weight, or in an amount in the range of from about 20% to about 80% by weight, or in an amount in the range of from about 30% to about 70% by weight, or in an amount in the range of from about 40% to about 60% by weight, based upon the weight of the entire composition of and the styrene block copolymer in an amount in the range of from about 95% to about 5% by weight, particularly in an amount in the range of from about 80% to about 20% by weight, particularly in an amount in the range of from about 70% to about 30% by weight, particularly in an amount in the range of from about 60% to about 40% by weight, based upon the weight of the entire composition. Exemplary weight ratios of styrene block copolymer to polyolefin or thermoplastic vulcanizate are about 95:5, about 90:10, about 85:15, about 80:20, about 75:25, about 70:30, about 65:35, about 60:40, about 55:45, about 50:50, based on the total weight of styrene block copolymer and polyolefin or styrene block copolymer and thermoplastic vulcanizate. The construction of a closure using a peripheral layer formed from this blend provides a closure which is highly suitable for use as a wine bottle closure.

In a further alternate embodiment, a highly effective closure is attained by employing at least one of at least one metallocene catalyst polyethylene and at least one olefin block copolymer, either independently or in combination with at least one selected from the group consisting of low density polyethylenes, medium density polyethylenes, and medium low density polyethylenes. In this embodiment, these materials are particularly employed for both core member and peripheral layer.

Still further additional compounds which have been found to provide highly effective peripheral layers for forming closures, in accordance with the present disclosure, comprise TEFLON®, fluoroelastomeric compounds and fluoropolymers. These compounds, whether employed individually or in combination with each other or with the other compounds detailed above have been found to be highly effective in producing a peripheral layer which is capable of providing at least one, particularly more than one, particularly almost all or even all of the properties making it suitable for synthetic bottle closures.

Any of the compounds detailed herein for providing the at least one peripheral layer can be employed alone or in combination with each other, using the extrusion processes detailed above to produce a peripheral layer which is securely and integrally bonded to the core member and/or to a different peripheral layer, as a foamed outer layer or a non-foamed outer layer, or as an intermediate layer.

The at least one peripheral layer, if present, particularly the outer peripheral layer is particularly formed with a thickness and/or a density which are capable of imparting desired physical characteristics, such as resistance to bottling conditions, to the closure produced by the method of the present disclosure. The at least one peripheral layer, particularly the outer peripheral layer is, in particular, formed with a substantially greater density than the inner core and/or with a selected thickness.

Accordingly, said at least one peripheral layer is particularly further defined as comprising a thickness ranging from about 0.05 mm to about 5 mm. Although this range has been found to be efficacious for producing a closure which is completely functional and achieves all of the desired goals, the exemplary aspect for wine bottles particularly comprises a thickness ranging from about 0.1 mm to about 2 mm, whereby exemplary lower limits for the thickness are about 0.05 mm, about 0.06 mm, about 0.07 mm, about 0.08 mm, about 0.09 mm, about 0.1 mm, about 0.2 mm, about 0.3 mm, about 0.4 mm or about 0.5 mm and exemplary upper limits for the thickness are about 1 mm, about 2 mm, about 3 mm, about 4 mm, or about 5 mm. The exemplary thickness of the at least one peripheral layer can be selected according to criteria such as, for example, the composition, physical properties and/or density of the material of the at least one peripheral layer, and the desired properties of the at least one peripheral layer.

The present disclosure particularly provides a peripheral layer with a tough, score and mar resistant surface. In this respect, it is advantageous according to this aspect of the method according to the present disclosure that said at least one peripheral layer is further defined as comprising a tough, score and mar resistant surface and/or a density ranging from about 300 $kg/m^3$ to about 1,500 $kg/m^3$, more particularly from about 505 $kg/m^3$ to about 1250 $kg/m^3$, and most particularly from about 750 $kg/m^3$ to about 1100 $kg/m^3$.

According to a particular aspect of the present disclosure the synthetic closure has an overall density of from about 100 $kg/m^3$ to about 800 $kg/m^3$, in particular from about 150 $kg/m^3$ to about 500 $kg/m^3$, in particular from about 200 $kg/m^3$ to about 500 $kg/m^3$, in particular from about 220 $kg/m^3$ to about 400 $kg/m^3$, in particular from about 250 $kg/m^3$ to about 375 $kg/m^3$.

It has also been found that further components, for example additives may be comprised in one or both of the core member and the at least one peripheral layer, if comprised, of the synthetic closure according to the present disclosure in order to provide further enhancements and desirable performance characteristics. Further components can be, for example additives, such as slip additives, lubricating agents, and sealing compounds, as well as other additives typically employed in the bottling industry. Such further components may be comprised in at least one outer, peripherally surrounding layer of the synthetic closure of the present disclosure, for example to provide lubrication of the synthetic closure during the insertion process, to improve the sealing engagement of the synthetic closure with the bottle, and/or to reduce the extraction forces necessary to remove the synthetic closure from the bottle for opening the bottle. Further components also comprise additional additives such as antimicrobial agents, antibacterial compounds, additives which reduce oxygen permeability, and oxygen scavenging materials. Suitable additives are known to the person skilled in the art. The antimicrobial and antibacterial additives can be incorporated into the closure to impart an additional degree of confidence that in the presence of a liquid the potential for microbial or bacterial growth is extremely remote. These additives have a long-term time release ability and further increase the shelf life without further treatments by those involved with the bottling of wine. Furthermore, it is possible for the cells of the closure to be substantially filled with a non-oxidising gas, in order to further reduce oxygen ingress into the container. Ways of achieving this are known in the prior art.

As discussed herein, intimate bonded interengagement of the at least one peripheral layer to the core member is advantageous for providing a synthetic bottle closure capable of being used in the wine industry. In this regard, although it has been found that the methods detailed herein provide secure intimate bonded interengagement of the at least one peripheral layer to the core member, alternative layers or bonding chemicals can be employed, depending upon the particular materials used for forming the core member and the at least one peripheral layer.

If desired, bonding agents or tie layers known to the skilled person can be employed on the outer surface of the core member in order to provide secure intimate bonded interengagement of the at least one peripheral layer therewith. If a tie layer is employed, the tie layer would effectively be interposed between the core member and the at least one peripheral layer to provide intimate bonded interengagement by effectively bonding the peripheral layer and the core member to the intermediately positioned tie layer. However, regardless of which process or bonding procedure is employed, all of these alternate embodiments are within the scope of the present disclosure. If more than one peripheral layer is present, such bonding agents or tie layers can similarly be employed between respective peripheral layers.

In addition, the closures obtained by the method of the present disclosure may also comprise decorative indicia such as letters, symbols, colors, graphics, and wood tones printed on at least one peripheral layer and/or one of the substantially flat terminating surfaces forming the opposed ends of said closure or stopper. Printing of these indicia can be performed in-line, during production of the closure or in a separate step after the closure has been manufactured. Accordingly, the closure of the present disclosure may comprise a decorative effect on at least one of the peripheral layer and the substantially flat terminating surfaces forming the opposed ends of said closure or stopper.

The closure according to the present disclosure can further comprise a silicone layer on at least one of its surfaces, in particular on its peripheral surface. Such a layer can help for example with insertion of the closure into a container. If a silicone layer is present, this is particularly formed by extrusion and/or by tumbling.

By employing the materials disclosed herein as at least one further polymer or copolymer and forming the combined material in peripheral, surrounding, bonded engagement with any desired foamed core member, a highly effective, multi-layer closure is attained which is able to provide at least one, particularly more than one, particularly almost all or even all properties suitable for a wine bottle closure.

The closure according to the present disclosure advantageously has an oxygen transfer rate (OTR) in axial direction as determined by Mocon measurement as described herein using 100% oxygen of from about 0.0001 cc/day/closure to about 0.1000 cc/day/closure, in particular from about 0.0005 cc/day/closure to about 0.050 cc/day/closure.

The present disclosure further relates to an exemplary method for producing a synthetic closure according to the present disclosure, said method comprising:
  a1. providing a core member composition comprising at least one cycloolefin-based copolymer;
  b1. providing at least one blowing agent to the core member composition to obtain a composition comprising at least one cycloolefin-based copolymer and at least one blowing agent;
  c1. at least one of before, during and after method step b1, heating the core member composition provided in method step a to obtain a heated composition;
  d1. extruding a continuous, elongated, substantially cylindrically shaped length of the heated composition obtained in method step c1 to obtain, as core member, a continuous elongated length comprising at least one cycloolefin-based copolymer and having a cylindrical surface;
  e1. optionally providing a peripheral layer composition comprising at least one thermoplastic polymer;
  f1. optionally extruding a separate and independent peripheral layer of the composition provided in method step e1 separately to, co-axially to and in intimate bonded engagement with the continuous, elongated length comprising at least one cyclic olefin copolymer obtained in method step e1, said separate and independent peripheral layer peripherally surrounding and substantially enveloping the cylindrical surface of the continuous, elongated length comprising at least one cycloolefin-based copolymer to obtain a multi-component elongated structure having a cylindrical surface;
  g1. cutting the continuous elongated length comprising at least one cycloolefin-based copolymer obtained in method step d1 or the multi-component elongated structure obtained in method step f1 in a plane substantially perpendicular to the central axis of the continuous elongated length or the multi-component elongated structure to obtain a closure;
  h1. optionally printing, coating, or post-treating at least one of the continuous elongated length comprising at least one cycloolefin-based copolymer obtained in method step d1, the multi-component structure obtained in method step f1 and the closure obtained in method step g1.

The present disclosure further relates to an exemplary method for producing a synthetic closure according to the present disclosure, said method comprising:
  a2. providing a core member composition comprising at least one cycloolefin-based copolymer;
  b2. providing at least one blowing agent to the core member composition to obtain a composition comprising at least one cycloolefin-based copolymer and at least one blowing agent;
  c2. at least one of before, during and after method step b2, heating the core member composition provided in method step a. to obtain a heated composition;
  d2. injecting the heated composition obtained in method step c2 into an injection mold;
  e2. maintaining the composition in the injection mold until the composition effectively hardens to form a molded closure;
  f2. removing the closure from the injection mold;
  g2. optionally printing, coating, or post-treating the closure obtained in method step f2.

Both methods disclosed allow the attainment of a closure according to the present disclosure.

The details regarding the at least one cycloolefin-based copolymer in the core member composition provided in method step a1 of the method disclosed herein are the same as the details for the cycloolefin-based copolymer described herein for the core member of the closure of the present disclosure. If a combination of cycloolefin-based copolymers is used, the composition provided in method step a1 comprises this combination. The composition provided in method step a1 can further comprise at least one thermoplastic polymer and can comprise further components, as disclosed for the core member of the present disclosure. The details regarding thermoplastic polymer and further components of the core member composition provided in method step a1 of the disclosed method are the same as the details for the further components described herein for the core member of the closure of the present disclosure.

According to a particular aspect of method step a1 of the method of the present disclosure it is possible to prepare a masterbatch of core member composition. If a masterbatch is prepared, this particularly comprises the at least one cycloolefin copolymer and at least one thermoplastic polymer, as disclosed herein with regard to the core member. If a masterbatch is prepared, the masterbatch can also comprise further components, such as those disclosed herein with regard to the core member. For example, one or more further components selected from the group consisting of at least one fatty acid, at least one fatty acid derivative, in particular at least one fatty acid amide, expandable microspheres and one or more blowing agents can be comprised in the masterbatch. Alternatively, a masterbatch comprising at least one thermoplastic polymer and at least one further component selected from the group consisting of at least one fatty acid, at least one fatty acid derivative, in particular at least one fatty acid amide, expandable microspheres and one or more blowing agents, in particular at least one fatty acid derivative, for example at least one fatty acid amide, can be prepared, or a masterbatch comprising at least one cycloolefin-based copolymer and at least one further component as disclosed herein in this context can be prepared. It is also conceivable to prepare more than one masterbatch, for example one or more masterbatches as described herein, said masterbatches then being combined to form the core member composition. If a masterbatch is prepared which does not comprise a cycloolefin-based copolymer, this masterbatch is combined with at least one cycloolefin-based copolymer in order to form the core member composition. The masterbatch can for example be prepared in the form of pellets, or any other form suitable for subsequent extrusion or injection molding to form a core member. A masterbatch can be prepared, for example, by means of mixing, pultrusion, extrusion, or by any other method known to the skilled person and appearing suitable. If a masterbatch is prepared, this can be carried out discontinuously with subsequent method steps, for example a masterbatch can be pre-prepared and optionally stored before further method steps. Alternatively, method step a1 can be carried out continuously with subsequent method steps, for example, a core member composition can be prepared in situ and supplied continuously to subsequent method steps.

The details regarding the blowing agent provided in method step b1 are the same as the details for the blowing agent described herein with respect to the closure of the present disclosure. Further additives can also be provided in method step b1, such as, for example, at least one nucleating agent. Details regarding such additives are the same as the details regarding additives described herein with respect to the closure of the present disclosure. If a masterbatch is prepared in method step a1 the blowing agent can be provided to in such a way that it is comprised in the masterbatch. If one or more of expandable microspheres and at least one blowing agent are combined into a masterbatch, care must be taken that the temperature to make the masterbatch, for example the extrusion temperature to make the masterbatch, is below the initiation temperature for the expandable microspheres and/or the blowing agent or agents. These initiation temperatures depend on the microspheres and blowing agents and are known or available to the skilled person.

If a fatty acid or a fatty acid derivative should be present in the closure according to the disclosure, this is advantageously provided in one of method steps a1 or b1. Details regarding suitable fatty acids and fatty acid derivatives are the same as the details regarding suitable fatty acids and fatty acid derivatives described herein with respect to the closure of the present disclosure. If a masterbatch is prepared, a fatty acid or a fatty acid derivative is advantageously provided such that it is present in the masterbatch.

The heating in method step c1 optionally occurs to a temperature at which the composition provided in method step a1 or the composition obtained in method step b1 is soft enough to enable foaming to the desired density and/or extrusion of the respective composition. If a blowing agent is used which requires heat to provide the blowing effect, the heating in method step c1 optionally occurs to a temperature at which this blowing effect can occur. Suitable temperatures depend principally on the cycloolefin copolymer, on the thermoplastic polymer and on the blowing agent selected and can be easily determined by the skilled person based on the known properties of the cycloolefin copolymer, of the thermoplastic polymer and the blowing agent and/or based on simple trials.

Method step d1 can occur in any way known to the skilled person and appearing suitable, in particular using known extrusion equipment.

The details regarding the peripheral layer composition provided in method step e1 are the same as the details regarding suitable materials, compounds and compositions described herein with respect to the at least one peripheral layer of the closure of the present disclosure.

Method step f1 can occur in any way known to the skilled person and appearing suitable, in particular using known extrusion equipment.

According to an aspect of the method according to the present disclosure, method step f1 occurs substantially simultaneously with method step d1.

According to a further aspect of the method according to the present disclosure, method step f1 occurs after method step d1.

According to a further aspect of the method according to the present disclosure, method step f1 can be repeated one or more times in order to obtain one or more further peripheral layers, whereby the one or more further peripheral layers are separately extruded in intimate bonded engagement with the cylindrical outer surface of the multicomponent elongated structure to form a multilayer elongated length of material.

After the extrusion in method step d1 and/or in method step f1, the continuous elongated length or the multi-component elongated structure can be cooled by methods known to the skilled person. These include, for example, passing through a cooling bath, spraying, blowing and the like.

The cutting in method step g1 and the optional printing, coating, or post-treating of method step h1 can be carried out in any way known and appearing suitable to the skilled person. Post-treating can comprise, for example, surface treatments such as plasma treatment, corona treatment, or providing a lubricant to the surface of the closure. If the core member and/or the peripheral layer comprises cork powder, it may be desirable to use branding to impart an image or writing onto the cylindrical surface or one or both flat surfaces of the closure, for example using branding methods known for natural cork closures.

The details regarding method steps a2., b2. and c2. are the same as the details disclosed herein regarding method steps a1, b1 and c1. The heating in method step c2. particularly occurs to a temperature at which the heated composition can be injection molded.

The injection molding of method steps d2., e2. and f2. can be carried out by methods known to the skilled person and appearing suitable for obtaining a core member according to the present disclosure.

The details regarding method step g2. are the same as the details disclosed herein regarding method step h1.

All details disclosed herein for the closures according to the present disclosure are also relevant for the methods according to the present disclosure and therefore also form part of the disclosure of the method disclosed herein. Furthermore, alternative or additional to the at least one cycloolefin-based copolymer, an isobutylene-based copolymer as described in the disclosure relating to the closures of the present disclosure may be comprised according to the methods disclosed herein, in the same way as the at least one cycloolefin-based copolymer.

The present disclosure also relates to an exemplary closure produced according to a method as described herein.

The present disclosure also relates to an exemplary closure obtained according to the methods disclosed herein, having the features defined according to the disclosure regarding the closure of the present disclosure.

The present disclosure also relates to an exemplary closure according to the present disclosure or prepared according to a method of the present disclosure and having at least one of the properties:

(a1) an oxygen transfer rate (OTR) in axial direction as determined by Mocon measurement as described herein using 100% oxygen of from about 0.0001 to about 0.1000 cc/day/closure, in particular from about 0.0005 to about 0.050 cc/day/closure, particularly from about 0.001 to about 0.023 cc/day/closure;

(a2) an instantaneous percent recovery as measured by the herein-described test method of greater than 82.0%, particularly in the range of from 82.0% to 87.0%, particularly in the range of from 82.1% to 86.5%, particularly in the range of from 82.2% to 86.0%, particularly in the range of from 82.3% to 85.5%, particularly in the range of from 82.4% to 85.0%, particularly in the range of from 82.5% to 85.0%, particularly in the range of from 82.6% to 85.0%, particularly in the range of from 82.7% to 85.0%, particularly in the range of from 82.8% to 85.0%, particularly in the range of from 82.9% to 85.0%, particularly in the range of from 83.0% to 85.0%;

(a3) a percent recovery at two minutes as measured by the herein-described test method of greater than 95%, particularly in the range of from 95.10% to 99.00%, particularly in the range of from 95.10% to 99.00%, particularly in the range of from greater than 95.10% to 99.00%, particularly in the range of from 95.15% to 98.00%, particularly in the range of from 95.20% to 97.50%, particularly in the range of from 95.25% to 97.00%, particularly in the range of from 95.30% to 96.50%, particularly in the range of from 95.32% to 96.30%, particularly in the range of from 95.32% to 96.00%;

(a4) a 1 h extraction force as measured by the herein-described test method in the range of from about 200 N to about 350 N, particularly in the range of from about 200 N to about 330 N, particularly in the range of from about 200 N to about 300 N, particularly in the range of from about 200 N to about 250 N;

(a5) a 14 day extraction force as measured by the herein-described test method in the range of from about 200 N to about 400 N, particularly in the range of from about 210 N to about 380 N, particularly in the range of from about 220 N to about 350 N, particularly in the range of from about 230 N to about 300 N.

The present disclosure also relates to an exemplary closure according to the present disclosure or prepared according to a method of the present disclosure having a core density in the range of from greater than 200 kg/m$^3$ to about 400 kg/m$^3$, particularly in the range of from greater than 200 kg/m$^3$ to about 350 kg/m$^3$, particularly in the range of from greater than 200 kg/m$^3$ to about 330 kg/m$^3$, particularly in the range of from greater than 200 to about 300 kg/m$^3$ and a diameter recovery at two minutes measured according to the herein described test method in the range of from greater than 95.1% to 98.0%, particularly in the range of from 95.2% to 97.0%, particularly in the range of from 95.3% to 96.5%, or having a core density in the range of from about 200 kg/m$^3$ to about 240 kg/m$^3$ and at least one of an instantaneous diameter recovery measured according to the herein described test method in the range of from 84.4% to 90.0%, particularly in the range of from 84.4% to 89.0%, particularly in the range of from 84.4% to 88.0%, particularly in the range of from 84.4% to 87.0% and a two minute diameter recovery measured according to the herein described test method in the range of from 94.3% to 98.0%, particularly in the range of from 94.3% to 98.0%, particularly in the range of from 94.4% to 97.0%.

The closure according to the present disclosure or produced according to the method of the present disclosure has advantageous properties making it particularly suitable for packaging and in particular for use as a closure for wine bottles. If the product is packaged under inert conditions, the closure advantageously has an oxygen ingress rate of less than about 1 mg oxygen per container in the first 100 days after closing the container, whereby the oxygen ingress rate is advantageously selected from the group consisting of less than about 0.5 mg oxygen, less than about 0.25 mg oxygen, less than about 0.2 mg oxygen and less than about 0.1 mg oxygen, per container in the first 100 days after closing the container. The closure according to the present disclosure or produced according to the method of the present disclosure achieves at least a comparable performance to known synthetic closures with respect to use as a closure for wine bottles, as measured by, for example, at least one of, particularly more than one of, particularly all of the properties of oxygen transfer rate, extraction force, and compression recovery.

Advantageously, the closure according to the present disclosure has an extraction force determined according to the herein described test method of not more than about 400 N, particularly of not more than about 390 N, particularly of not more than about 380 N, particularly of not more than about 370 N, particularly of not more than about 360 N, particularly of not more than about 350 N, particularly of not more than about 340 N, particularly of not more than about 330 N, more particularly of not more than about 320 N, more particularly of not more than about 310 N, more particularly of not more than about 300 N, whereby fourteen day extraction forces in the range of from about 200 N to about 400 N, particularly in the range of from about 210 N to about 380 N, particularly in the range of from about 220 N to about 350 N, particularly in the range of from about 230 N to about 300 N are advantageously achieved. The extraction force describes the force needed to remove a closure from a container, in particular from a bottle, under standardized conditions. A lower extraction force relates to a greater ease of extraction of the closure. An extraction force in the range of from about 200 N to about 400 N is generally considered acceptable for a wine bottle closure. The presently disclosed closures thus achieve extraction force within the range considered acceptable for wine bottle closures.

According to a further aspect of the closure according to the present disclosure or the closure produced according to the method according to the present disclosure, the closure comprises a peripheral layer surrounding and intimately bonded to the cylindrical surface of the core member and the end surfaces of the core member are substantially devoid of said layer.

The present disclosure also relates to an exemplary use of a closure as disclosed herein or produced according to a method described herein for sealing closed a container.

According to an aspect of the use disclosed herein, the closure has an oxygen ingress rate of less than about 1 mg oxygen per container in the first 100 days after closing the container.

According to this aspect of the use disclosed herein, the oxygen ingress rate is selected from the group consisting of less than about 0.5 mg oxygen, less than about 0.25 mg oxygen, less than about 0.2 mg oxygen and less than about 0.1 mg oxygen, per container in the first 100 days after closing the container.

The present disclosure also relates to an exemplary use of a cycloolefin-based copolymer in a synthetic closure for a product-retaining container constructed for being inserted and securely retained in a portal-forming neck of said container.

According to the present disclosure, a closure can be realized which is capable of providing at least one, particularly more than one, particularly almost all or even all of the needs imposed thereupon by the wine industry, as well as any other bottle closure/packaging industry. As a result, a synthetic bottle closure can be attained that can be employed for completely sealing and closing a desired bottle for securely and safely storing the product retained therein, optionally with desired markings and/or indicia printed thereon. The disclosure herein concerning the closures of the present disclosure also applies to the closures prepared by the presently disclosed method. The disclosure herein concerning the closures prepared by the presently disclosed method also applies to the closures of the present disclosure.

It will thus be seen that the needs set forth above, among those made apparent from the preceding description, are efficiently obtained and, since certain changes may be made in carrying out the above method without departing from the scope of this disclosure, it is intended that all matter contained in the above description or shown in the accompanying drawings shall be interpreted as illustrative and not in a limiting sense. Furthermore, it should be understood that the details of the disclosure described in the foregoing detailed description are not limited to the specific embodiments shown in the drawings but are rather meant to apply to the present disclosure in general as outlined in the summary of the present disclosure and in the claims.

It is also to be understood that the following claims are intended to cover all of the generic and specific features of the present disclosure herein described, and all statements of the scope of the present disclosure which, as a matter of language, might be said to fall there between.

We claim:

1. A synthetic closure for a product-retaining container constructed for being inserted and securely retained in a portal-forming neck of said container, said closure comprising:
   a) a core member comprising at least one cycloolefin-based copolymer in an amount in a range of from 0.01 wt. % to 20 wt. %, based on a total weight of the core member; and at least one thermoplastic polymer in an amount in a range of from 70 wt. % to 99.99 wt. %, based on the total weight of the core member, wherein the at least one thermoplastic polymer is selected from the group consisting of polyethylenes, metallocene catalyzed polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers and mixtures thereof;
   wherein the core member comprises a plurality of cells.

2. The closure according to claim 1, further comprising:
   (b) at least one peripheral layer at least partially surrounding and intimately bonded to at least one surface of the core member, said at least one peripheral layer comprising at least one thermoplastic polymer.

3. The closure according to claim 2, wherein the at least one peripheral layer comprises at least one thermoplastic polymer selected from the group consisting of polyethylenes, metallocene catalyzed polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers and combinations of two or more thereof.

4. The closure according to claim 2, wherein the core member and the at least one peripheral layer are extruded substantially simultaneously or the core member is extruded separately, and subsequent thereto the at least one peripheral layer is formed in extrusion equipment peripherally surrounding and enveloping the core member.

5. The closure according to claim 2, wherein the at least one peripheral layer comprises a plurality of cells.

6. The closure according to claim 5, wherein the plurality of cells of the at least one peripheral layer comprises a cell size in a range of from about 0.05 mm to about 0.35 mm.

7. The closure according to claim 5, wherein the core member comprises at least one of an average cell size ranging from about 0.05 mm to about 0.1 mm or a cell density ranging from about 1,000,000 cells/cm$^3$ to about 8,000,000 cells/cm$^3$.

8. The closure according to claim 2, wherein said closure has a substantially cylindrical shape comprising substantially flat terminating surfaces forming opposed ends of said closure and the substantially flat terminating surfaces of the core member are substantially devoid of the at least one peripheral layer.

9. The closure according to claim 1, wherein the at least one cycloolefin-based copolymer has at least one of the following properties:
(i) a density measured according to ISO 1183 in a range of from 900 kg/m$^3$ to 1000 kg/m$^3$;
(ii) a Shore A hardness measured according to ISO 868 in a range of from 80 to 100;
(iii) a glass transition temperature in a range of from −10 to 10° C.;
(iv) a tensile modulus measured according to ISO 527-T2/1A at 23° C. and 1 mm/min in a range of from 35-55 MPa;
(v) a tensile strain at break measured according to ISO 527-T2/1A at 50 mm/min in a range of >400%;
(vi) a compression set measured according to ISO 815 at 24 h and 23° C. in a range of from 25% to 40%;
(vii) a compression set measured according to ISO 815 at 24 h and 70° C. in a range of from 75% to 95%; or
(viii) a Vicat softening temperature VST/A50 measured according to ISO 306 in a range of from 60 to 70° C.

10. The closure according to claim 1, wherein the at least one cycloolefin-based copolymer comprises:
(A1) 20 mol % to 80 mol % of repeating units derived from at least one linear polymerisable ethylenically unsaturated monomer unit;
(A2) 80 mol % to 20 mol % of repeating units derived from at least one cyclic ethylenically unsaturated monomer unit which are copolymerisable with the repeating units derived from the at least one linear polymerisable ethylenically unsaturated monomer unit; and
(A3) 0 mol % to 10 mol % of repeating units derived from at least one further ethylenically unsaturated monomer unit and which are copolymerisable with at least one of (i) the repeating units derived from the at least one linear polymerisable ethylenically unsaturated monomer unit or (ii) the repeating units derived from the at least one cyclic ethylenically unsaturated monomer unit.

11. The closure according to claim 10, wherein the at least one linear polymerisable ethylenically unsaturated monomer unit is an α-olefin.

12. The closure according to claim 10, wherein the at least one cyclic ethylenically unsaturated monomer unit is selected from the group consisting of norbornene, alkyl substituted norbornene, vinyl norbornene, norbornadiene, and tetracyclododecene.

13. The closure according to claim 1, wherein the at least one cycloolefin-based copolymer is a copolymer of ethylene and norbornene.

14. The closure according to claim 1, wherein the core member further comprises at least one fatty acid amide.

15. The closure according to claim 1, wherein the closure is formed by a process comprising at least a process step of extrusion.

16. The closure according to claim 1, wherein the closure is produced by a process comprising at least a process step of coextrusion.

17. The closure according to claim 1, wherein the closure is formed by a process comprising at least a process step of molding.

18. The closure according to claim 1, wherein at least one of a size or a distribution of the plurality of cells in the core member is substantially uniform throughout at least one of a length or a diameter of the core member.

19. The closure according to claim 1, wherein the plurality of cells is a plurality of substantially closed cells.

20. The closure according to claim 1, wherein the plurality of cells comprises a cell size in a range of from about 0.025 mm to about 0.5 mm.

21. The closure according to claim 1, wherein the core member comprises closed cells having at least one of an average cell size ranging from about 0.02 millimeters to about 0.50 millimeters or a cell density ranging from about 8,000 cells/cm$^3$ to about 25,000,000 cells/cm$^3$.

22. The closure according to claim 1, having an overall density of from about 100 kg/m$^3$ to about 800 kg/m$^3$.

23. The closure according to claim 1, having at least one of the following properties:
(a1) an oxygen transfer rate (OTR) in an axial direction as determined by Mocon measurement as described herein using 100% oxygen of from about 0.0001 to about 0.1000 cc/day/closure;
(a2) an instantaneous percent recovery as measured by the herein-described test method in a range of from 82.0% to 87.0%;
(a3) a percent recovery at two minutes as measured by the herein-described test method in a range of from 95.10% to 99.00%;
(a4) a 1 h extraction force as measured by the herein-described test method in a range of from about 200 N to about 350 N; or
(a5) a 14 day extraction force as measured by the herein-described test method in a range of from about 200 N to about 400 N.

24. The closure according to claim 1, having a core density in a range of from greater than 240 kg/m$^3$ to about 400 kg/m$^3$ and a diameter recovery at two minutes measured according to the herein described test method in a range of from greater than 95.1% to 98.0%, or having a core density in a range of from about 200 kg/m$^3$ to about 240 kg/m$^3$ and at least one of an instantaneous diameter recovery measured according to the herein described test method in a range of from 84.4% to 90.0% or a two minute diameter recovery measured according to the herein described test method in a range of from 94.3% to 98.0%.

25. The closure according to claim 1, having an overall density of from about 150 kg/m$^3$ to about 500 kg/m$^3$.

26. A method for producing a synthetic closure for a product-retaining container, said method comprising:
a1. providing a core member composition comprising at least one cycloolefin-based copolymer in an amount in a range of from 0.01 wt. % to 20 wt. %, based on a total weight of the core member composition; and at least one thermoplastic polymer in an amount in a range of from 70 wt. % to 99.99 wt. %, based on the total weight of the core member composition, wherein the at least one thermoplastic polymer is selected from the group consisting of polyethylenes, metallocene catalyzed polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers and mixtures thereof;

b1. providing at least one blowing agent to the core member composition to obtain a composition comprising the at least one cycloolefin-based copolymer and the at least one blowing agent;

c1. at least one of before, during or after method step b1, heating the core member composition provided in method step a1 to obtain a heated composition;

d1. extruding a continuous, elongated, substantially cylindrically shaped length of the heated composition obtained in method step c1 to obtain, as the core member composition, a continuous, elongated, substantially cylindrically shaped length comprising the at least one cycloolefin-based copolymer and having a cylindrical surface; and e1. cutting the continuous, elongated, substantially cylindrically shaped length comprising the at least one cycloolefin-based copolymer obtained in method step d1 in a plane substantially perpendicular to a central axis of the continuous, elongated, substantially cylindrically shaped length to obtain the closure.

27. The method of claim 26, further comprising:

f1. providing a peripheral layer composition comprising at least one thermoplastic polymer.

28. The method of claim 27, further comprising:

g1. extruding a separate and independent peripheral layer of the peripheral layer composition provided in method step f1 separately to, co-axially to, and in intimate bonded engagement with the continuous, elongated, substantially cylindrically shaped length comprising the at least one cycloolefin-based copolymer obtained in method step e1, said separate and independent peripheral layer peripherally surrounding and substantially enveloping the cylindrical surface of the continuous, elongated, substantially cylindrically shaped length comprising the at least one cycloolefin-based copolymer to obtain a multi-component elongated structure having a cylindrical surface.

29. The method of claim 28, further comprising:

h1. optionally printing, coating, or post-treating at least one of the continuous, elongated, substantially cylindrically shaped length comprising the at least one cycloolefin-based copolymer obtained in method step d1, the multi-component elongated structure obtained in method step g1, or the closure obtained in method step e1.

30. A method for producing a synthetic closure for a product-retaining container, said method comprising:

a2. providing a core member composition comprising at least one cycloolefin-based copolymer in an amount in a range of from 0.01 wt. % to 20 wt. %, based on a total weight of the core member composition; and at least one thermoplastic polymer in an amount in a range of from 70 wt. % to 99.99 wt. %, based on the total weight of the core member composition, wherein the at least one thermoplastic polymer is selected from the group consisting of polyethylenes, metallocene catalyzed polyethylenes, polybutanes, polybutylenes, polyurethanes, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, thermoplastic olefins, thermoplastic vulcanizates, flexible polyolefins, fluoroelastomers, fluoropolymers, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers and mixtures thereof;

b2. providing at least one blowing agent to the core member composition to obtain a composition comprising the at least one cycloolefin-based copolymer and the at least one blowing agent;

c2. at least one of before, during or after method step b2, heating the core member composition provided in method step a2 to obtain a heated composition;

d2. injecting the heated composition obtained in method step c2 into an injection mold;

e2. maintaining the heated composition in the injection mold until the heated composition effectively hardens to form a molded closure; and f2. removing the molded closure from the injection mold.

31. The method of claim 30, further comprising:

g2. optionally printing, coating, or post-treating the molded closure obtained in method step f2.

* * * * *